Aug. 27, 1940. M. EWALD Re. 21,540

METHOD AND APPARATUS FOR TREATING FRUIT

Original Filed Sept. 27, 1932 10 Sheets-Sheet 1

INVENTOR.
Mark Ewald

BY
Elmer W. Lloyd
ATTORNEY.

Aug. 27, 1940. M. EWALD Re. 21,540

METHOD AND APPARATUS FOR TREATING FRUIT

Original Filed Sept. 27, 1932 10 Sheets-Sheet 2

BY

Inventor:
Mark Ewald
Murphy & Hood
ATTORNEY.

METHOD AND APPARATUS FOR TREATING FRUIT

Original Filed Sept. 27, 1932 10 Sheets-Sheet 3

INVENTOR.

Mark Ewald

BY

ATTORNEY.

Aug. 27, 1940. M. EWALD Re. 21,540

METHOD AND APPARATUS FOR TREATING FRUIT

Original Filed Sept. 27, 1932 10 Sheets-Sheet 4

INVENTOR.
Mark Ewald

BY
Elmer A. Lloyd
ATTORNEY.

Aug. 27, 1940. M. EWALD Re. 21,540

METHOD AND APPARATUS FOR TREATING FRUIT

Original Filed Sept. 27, 1932 10 Sheets-Sheet 5

INVENTOR.
Mark Ewald

ATTORNEY.

METHOD AND APPARATUS FOR TREATING FRUIT

Original Filed Sept. 27, 1932 10 Sheets-Sheet 6

INVENTOR.
Mark Ewald

BY
Clerk M. Hogg
ATTORNEY.

METHOD AND APPARATUS FOR TREATING FRUIT

Original Filed Sept. 27, 1932 10 Sheets-Sheet 7

INVENTOR.
Mark Ewald

BY

ATTORNEY.

Aug. 27. 1940. M. EWALD Re. 21,540
METHOD AND APPARATUS FOR TREATING FRUIT
Original Filed Sept. 27, 1932 10 Sheets-Sheet 8
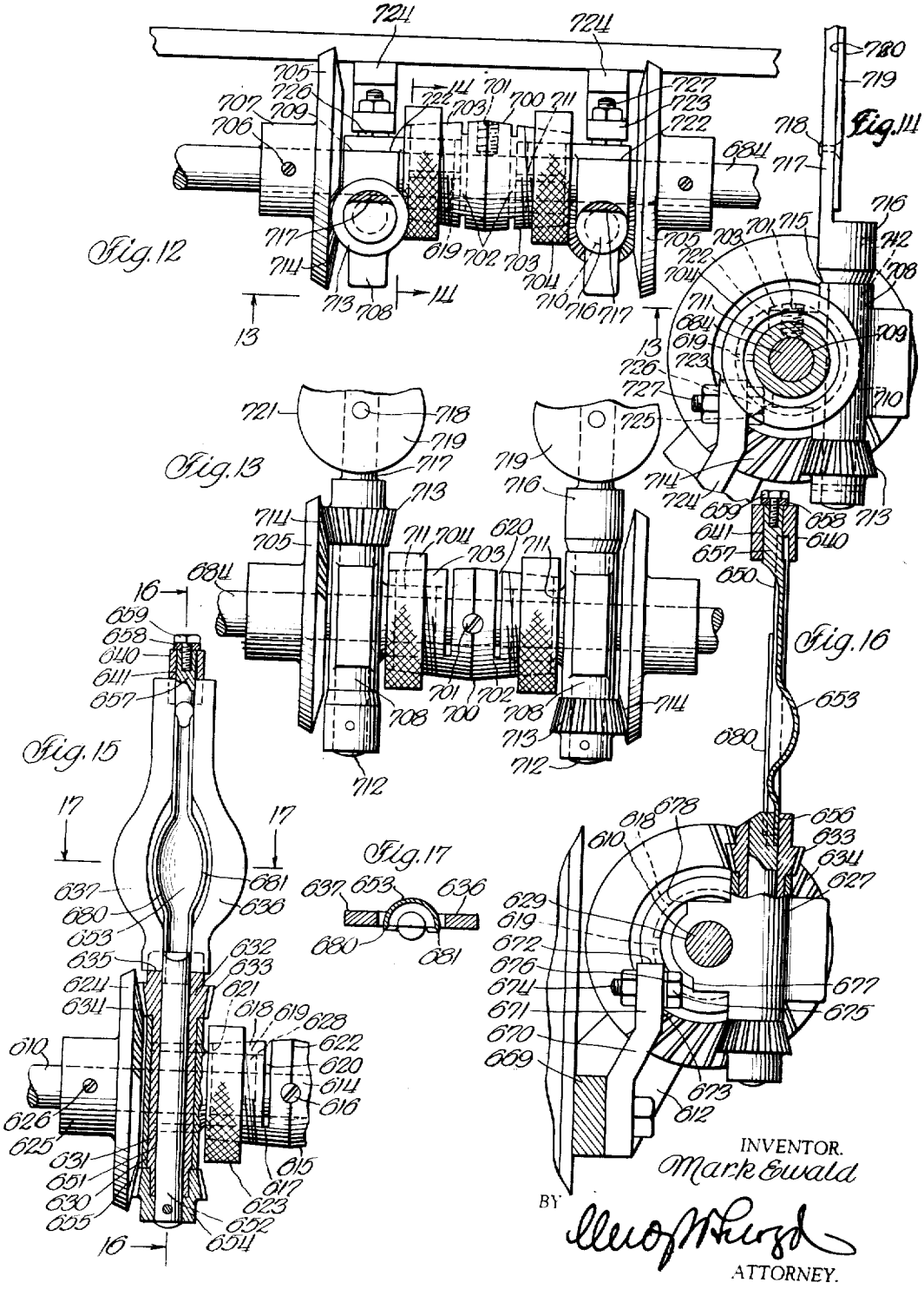

METHOD AND APPARATUS FOR TREATING FRUIT

Original Filed Sept. 27, 1932 10 Sheets-Sheet 9

INVENTOR.
Mark Ewald
BY
Alexander Wright
ATTORNEY.

Aug. 27, 1940. M. EWALD Re. 21,540

METHOD AND APPARATUS FOR TREATING FRUIT

Original Filed Sept. 27, 1932 10 Sheets-Sheet 10

INVENTOR.
Mark Ewald

ATTORNEY.

Reissued Aug. 27, 1940

Re. 21,540

UNITED STATES PATENT OFFICE 21,540

METHOD AND APPARATUS FOR TREATING FRUIT

Mark Ewald, Olympia, Wash., assignor to Special Equipment Company, Portland, Oreg., a corporation of Oregon Original No. 2,201,967, dated May 21, 1940, Serial No. 4,239, January 31, 1935, which is a division of application Serial No. 635,061, September 27, 1932. Application for reissue June 26, 1940, Serial No. 342,589

102 Claims. (Cl. 146—38)

The present invention relates to a method and apparatus for treating half fruit and is concerned not only with the method and apparatus for peeling a half fruit while held, but also is concerned with the method and apparatus for severing the seed-carrying portion of the half fruit and with discharging the half fruit free of the seed-carrying portion from the holding means. The invention also includes the discharging of the seed-carrying portion into the holding means, in one aspect of the invention, and discharging the severed seed-carrying portion into the peeling retained in the holding means, the half fruit being discharged from the holding means.

This application is a division of the application in the name of Mark Ewald, Serial Number 635,061, dated September 27, 1932, and entitled Fruit treating apparatus.

The objects of my invention are to provide a method and apparatus for cutting the seed-carrying portion from the half fruit while the half fruit is held in suitable holding means, and thereafter to remove the half fruit from the holding means in such a manner that the severed seed-carrying portion is left in the holding means for subsequent scavenging; to provide a fruit-treating method and apparatus for removing the seed-carrying portion of a half fruit while the fruit is held in a holding means and for discharging the half fruit from the holding means by turning the half fruit about an axis lying parallel to the cut face of the half fruit so as to substantially invert and discharge the half fruit from the holding means and likewise simultaneously to discharge the severed seed-carrying portion into the holding means; to provide a method and apparatus for severing the seed-carrying portion of a half fruit and for discharging the half fruit from its holding means by turning the half fruit about an axis extending parallel to the cut face of the half fruit to a substantially inverted position and simultaneously operating a cutting mechanism about substantially the same axis whereby to sever the seed-carrying portion of the half fruit and to discharge the severed seed-carrying portion within the receiving means; to provide further means for bodily moving the half fruit wholly from its inverted position over the receiving means and in such a manner that the wet or sticky half fruit cannot adhere to the removing means; to provide an automatic machine for treating half fruit from which the central seed-carrying portion has been severed wherein the half fruit is bodily lifted from its holding means and is thereafter forcibly separated from the lifting means to prevent adhesion between the wet, sticky fruit and the lifting means; and to provide a method and apparatus for removing the seed-carrying portion of a half fruit wherein the cutting action for removing the seed-carrying portion is accomplished while the half fruit remains in the fruit holder, preferably a substantially cup-shaped receptacle, and wherein the half fruit, after having the seed-carrying portion removed, is discharged from the cup independently of its seed-carrying portion.

These objects and such other objects as may hereinafter appear are obtained by the novel construction, improved arrangement, and unique combination of the several elements which constitute the invention, one form of which is shown in the accompanying several sheets of drawings hereby made a part of this specification.

In the accompanying drawings,

Figure 12 is a view in perspective of the peel removing mechanism as taken from above;

Figure 13 is an elevation of the peel removing mechanism with parts broken away and taken from the side as indicated by lines 13—13 in Figure 12;

Figure 14 is a transverse sectional view of the peel removing mechanism taken at the line 14—14 of Figure 12;

Figure 15 is a perspective side view of an instrumentality for severing the seed-carrying portion of the half fruit and showing parts in cross-section;

Figure 16 is a longitudinal sectional view of the instrumentality for removing the seed-carrying portion taken at the plane indicated by line 16—16 of Figure 15;

Figure 17 is a cross-sectional view taken along the line 17—17 of Figure 15, showing constructional details;

Like reference characters are used throughout the following description and in the drawings to indicate similar parts.

Figure 1:
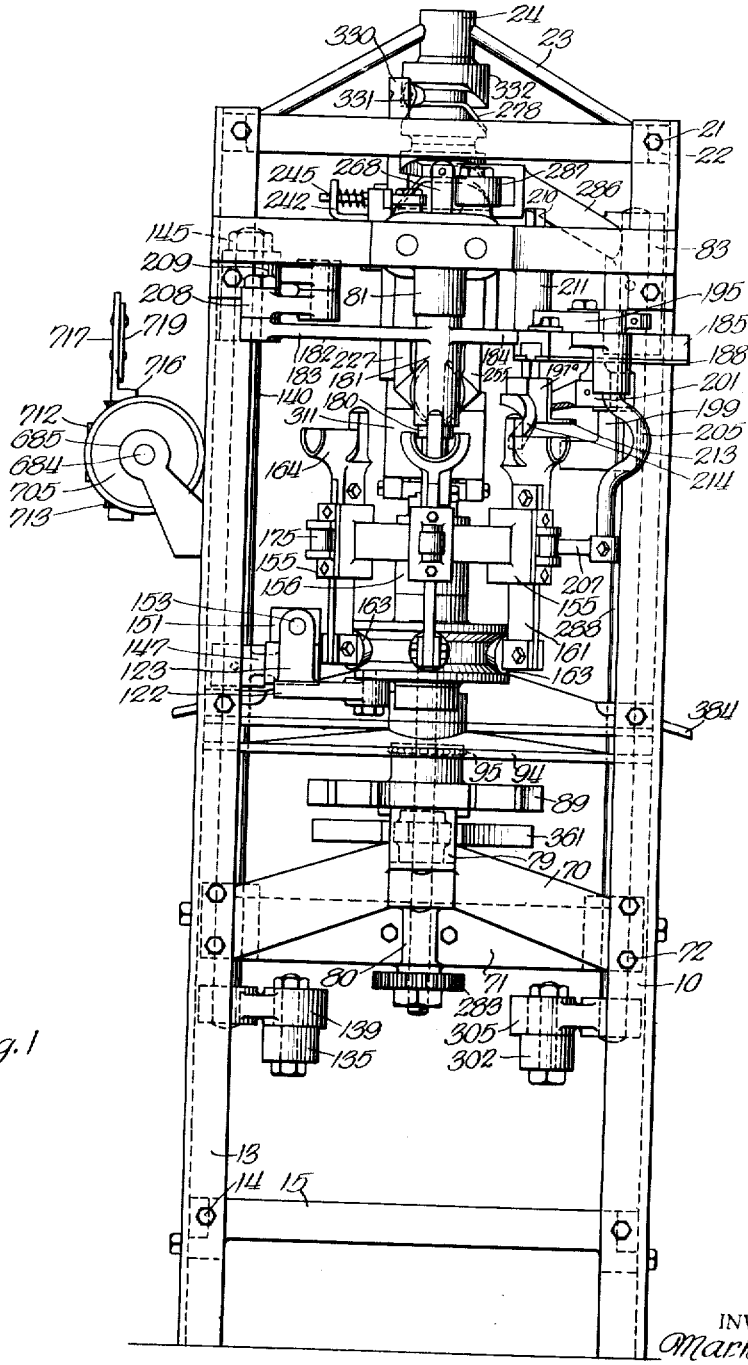
Figure 1 is a side elevation of a device provided with peeling means and means for severing the seed-carrying section of the half fruit, in which the present invention is used, taken from the front, with certain parts not shown to clarify assembly of other parts.

The invention herein claimed is illustrated and described in connection with a type of automatic machine for receiving whole fruit, which as it passes through the machine is first cut into halves, then peeled, then cut so as to have the seed-containing portion severed therefrom, then automatically ejected from the machine, leaving the peeling and seed-containing section, and then the peeling and seed-containing section are scavenged from the machine. It is understood, however, that the invention and claims of this application are not limited to a machine wherein the various functions are carried out in the illustrated sequence, or are not limited to a machine having all of the sequence of operations carried out therein; on the contrary, the invention and claims of the present application are of broad scope and cover the utilization of the process and apparatus as applied to any type of machine for one or more claimed operations on fruit and particularly half fruit.

For purposes of illustration but not by way of limitation, I have illustrated the invention of the present application as carried out by an apparatus like that disclosed in my prior application, Serial No. 635,061, filed September 27, 1932, of which the present application is a division.

*The frame*

A frame is provided for supporting the entire apparatus and comprises upright members 10, 11, 12 and 13. Four cross bars 15 describing a square are secured to members 10, 11, 12 and 13 near their bottoms by studs 14.

Upon cross bar 15 between standards 11 and 12 is a vertical bracket 17 held in position by studs 16. Bracket 17 has a broadened end 18 adjacent cross bar 15 and at its upper end has a flared section 19 presenting a flat face inward of the frame. The upper end of bracket 17 is secured by a strap 20 affixed to upright 12.

The butt 54 of a horizontal bearing member 55 is fitted against the face of section 19 and secured thereto by means of cap screws 56. The member 55 has, in alignment, a tapped boring 57 and two bearings 58 and 59, all of which have vertical axes. The bearing 59 is centrally located relative to the frame. A lug 60 forms the forward end of the cross member 55 which has a rib 61 coextensive its longitudinal extent. The four standards 10, 11, 12 and 13 are held together at their tops by a casting 22, studs 21 extending through the uprights into the casting. Rods 23 extend inwardly and upwardly from each corner of the casting 22 to a central crown bearing 24.

*The driving mechanism*

The machine may be coupled in any manner to a suitable prime mover. In the illustrated device a belt pulley 25 is rotatively mounted upon a main drive shaft 26. The shaft 26 is journaled in bearing blocks 27 and 28 secured to the upright members 11 and 12, respectively.

An internal cone clutch 29 projects from the hub of pulley 25. A second element 30 is keyed to the shaft 26 in a manner permitting of longitudinal movement therealong. Element 30 contains a coniform recess 31 having an inclined wall 32. The member 30 has at its side an annular boss 33. A hand wheel 34 may be keyed to the end of shaft 26 and may serve as a stop to prevent the member 30 from sliding off the end of said shaft 26.

Lever 35 is used for shifting the position of the clutch member 30. Said lever 35 has a bifurcated end 36 with slots 37 which clear the boss 33 so that the boss may rotate therein. Between the end 36 and handle 38 on the lever 35 said lever has a vertical bearing 39.

A side bar 40 is suspended between uprights 10 and 11 and has a centrally drilled and tapped fitting 41. Bearing 39 of lever 35 is seated in fitting 41 and operates about the shank of a bolt 42 threaded into member 41.

Between pulley 25 and the bearing block 27 there is a small pinion 43 keyed to the shaft 26.

Cross member 15 between standards 10 and 11 has a boss 44. A bearing standard 47 having a foot 46 is secured to boss 44 by a stud 45. Standard 47 also has a horizontal leg 48 having therein a bearing 49, and has its end suitably fastened to upright 11.

Opposite standard 47 is a similar standard 50 similarly secured to upright 12 and to the cross brace 15 between vertical members 12 and 13. Standard 50 has a bearing 51 complemental to and in alignment with bearing 49. A cam shaft 52 is rotatively mounted within the bearings 49 and 51 and extends beyond the standard 47. The extension beyond standard 47 has a gear wheel 53 keyed thereto, said gear wheel meshing with the pinion 43.

*The loading mechanism*

A substantially triangular base frame 70 for a loading mechanism is disposed between the vertical frame standards 10 and 13. A horizontal cross bar 71 of frame 70 is secured to said standards by studs 72. Cross bar 71 has at its mid-section a flat face 73 (see Figure 19) coinciding with the end plate 60 for supporting the front end of the horizontal bearing member 55. Cap screws 74 extend between said parts. Frame 70 has vertical bearings 75 and 76 at the two ends of cross bar 71, these bearings being within the corners of the frame formed by the standards 10 and 13, respectively.

Cross bar 71 has integral therewith truss members 75a which unite in a circular lug 76a having therein a vertical bearing 77. Extending directly from the lug 76a and upwardly within the plane described by the trusses 75a is an arm 78. Arm 78 has in its end a vertical bearing 79. A reinforcing member 80 connects the lug 76a and the mid-section of cross bar 71.

A trapezoidal structure 84 projects forwardly of the machine from adjacent the top of uprights 10 and 13. Structure 84 includes members 83 joined by a cross bar 82 having a boss 81 above bearing 79. The boss 81 has a central aperture 85. Aperture 85 and the bearing 79 support a vertical shaft 86 in a nonrotative manner.

Upon the top face of bearing member 79 is a sleeve 87 which is free to rotate about the shaft 86. Secured to the sleeve 87 is the hub 88 of a Geneva cam 89. The cam 89 (Figure 19) comprises a flat plate having spaced alternately about its circumference six radial grooves 90 and six arcuate cut-away sections 91.

A spindle 92 has its lower end journaled in bearing 77. The upper end of said spindle is rotatively mounted in a bearing 93 in a hood 94 which covers the lower part of the machine. A small sprocket 95 is keyed to spindle 92 beneath hood 94. Feathered to said spindle 92 at its lower end is a cam member 96 which actuates the Geneva gear 89. Member 96 comprises an eccentric plate 97 maintained in a horizontal plane just below that described of the Geneva gear 89 by a hub 98 which rides on the upperface of bearing block 76a.

A roller bearing 99 is on a pin 100 disposed adjacent the point of plate 97. Opposed to the roller 99 and upon the upper face of the eccentric plate 97 is a superposed plate 101 having an arcuate body 102 of equal radius to that describing the arcuate sections 91 of the Geneva gear 89. The arcuate edge of body 102 is interrupted by an arcuate cut out 103 having ends forming shoulders 104 and 105.

A beveled pinion 106 is mounted upon cam shaft 52 by set screw 107. A bevel gear 109 meshing with pinion 106 is similarly mounted on the lower end of a shaft 108 vertically mounted in the bearing 58. An offset hub 110 extends upwardly from the gear 109 and bears an annular toothed shoulder 111. The extreme upper end of the shaft 108 carries a sprocket 112 which is in the same plane with sprocket 95. The two sprockets 95 and 112 are operatively connected by a suitable chain 113.

Figure 2:
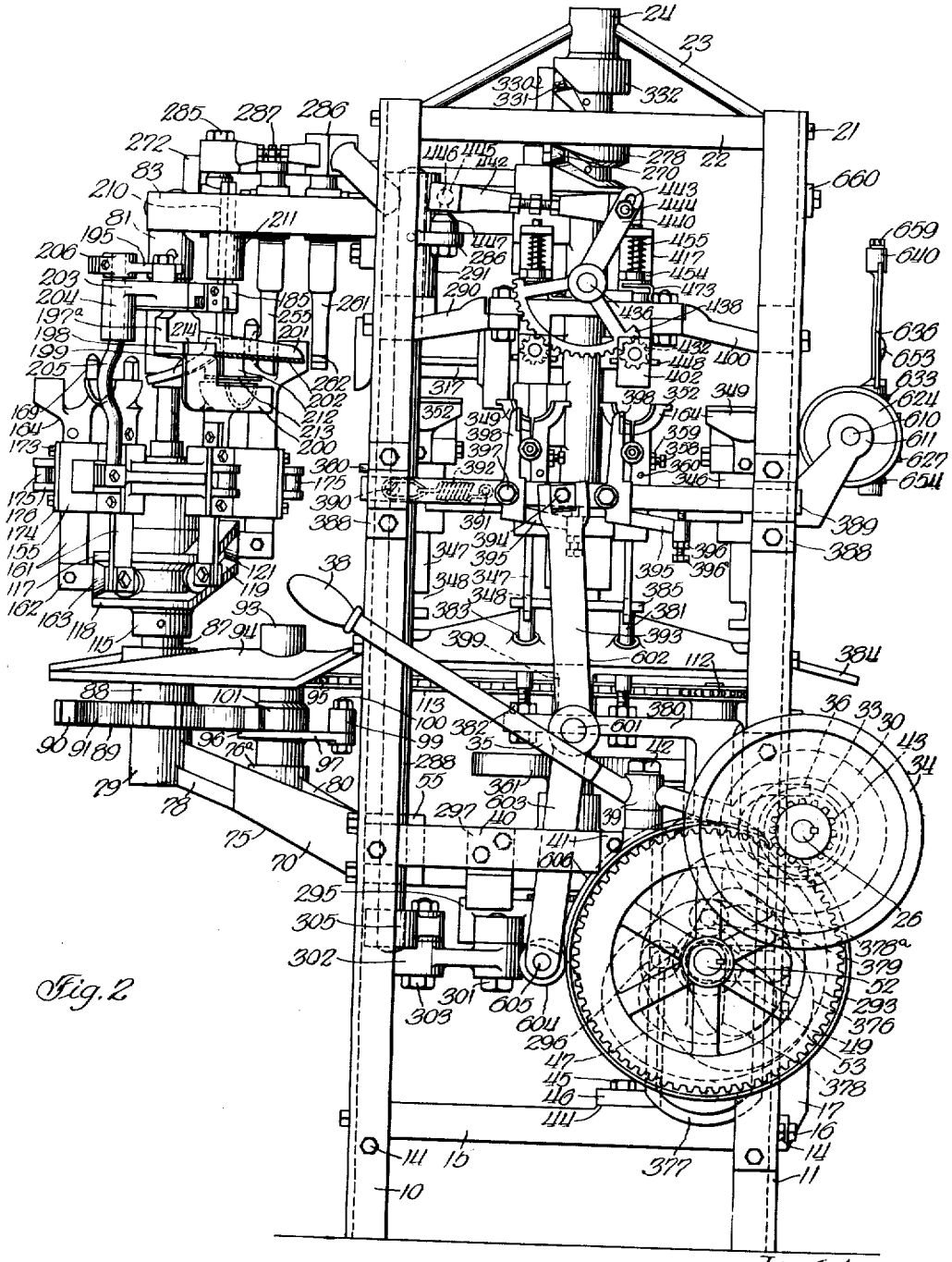
Figure 2 is a side elevation of the device shown in Figure 1 as taken from the right side.

The hood 94 has therein a hole 114 that circumscribes the sleeve 87. Secured to the sleeve 87 just above the hood 94 is a collar 115. The collar 115 is a base or rest for a rotating cam 116 having flanges 117 and 118 defining an irregular race or track. An upwardly inclined camming surface 119 succeeded by a downwardly inclined camming surface 120 (not clearly shown) are included in the cam 116. A point 121 dividing the camming surfaces 119 and 120 is shown at the rear side of the cam in Figure 2.

Depending from the flange 118 is a horizontal arm 122 having an upturned lug 123. The arm 122 is secured upon the flange 118 by means of a bolt 124 so that a movement of the end 123 of said arm will result in rotary motion being transmitted to the cam 116 rather than a pivotal movement of the arm 122 about bolt 124.

Figure 4:
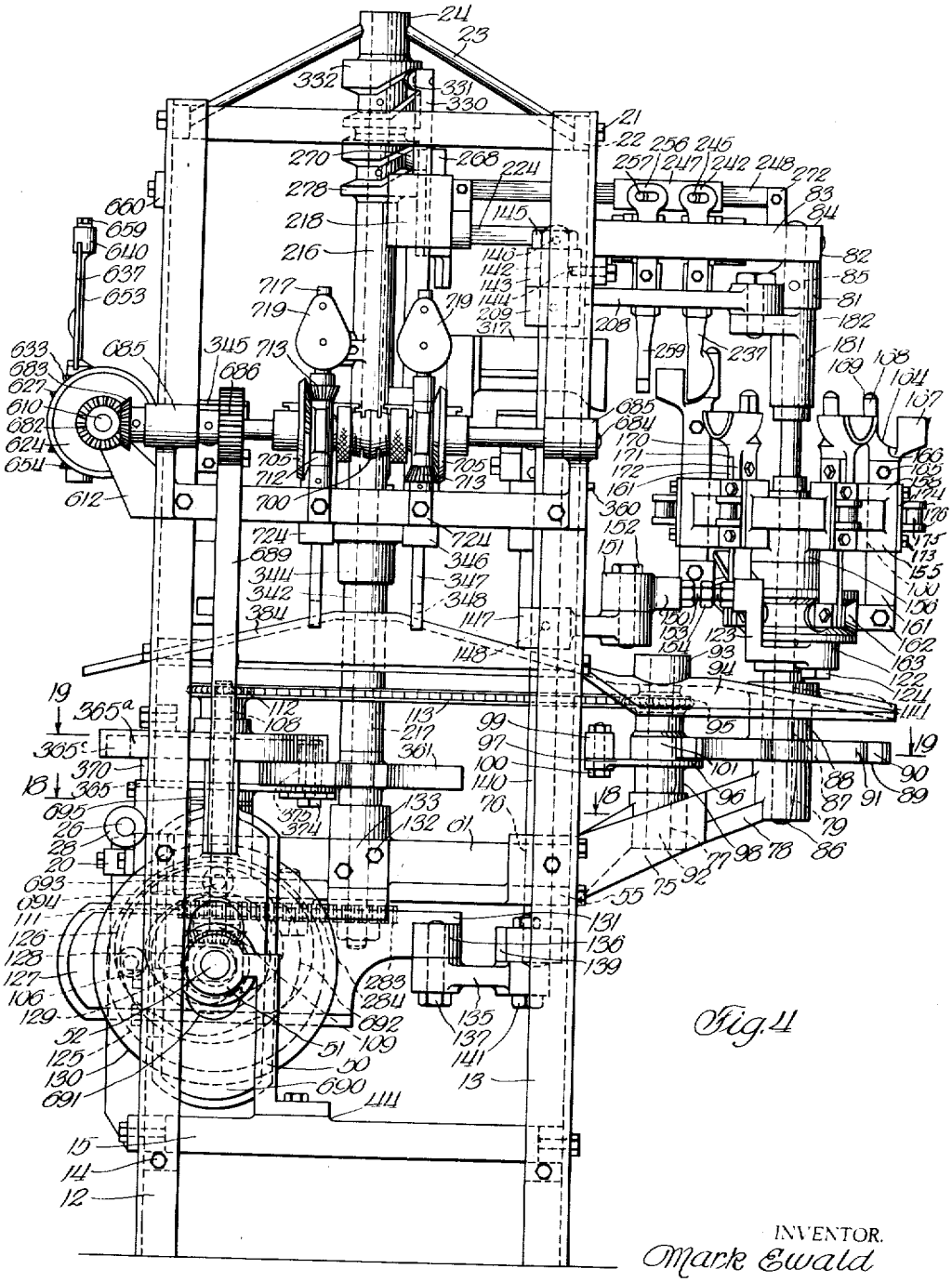
Figure 4 is an elevation of the machine as taken from the left side with certain background parts not shown.
Figure 5:
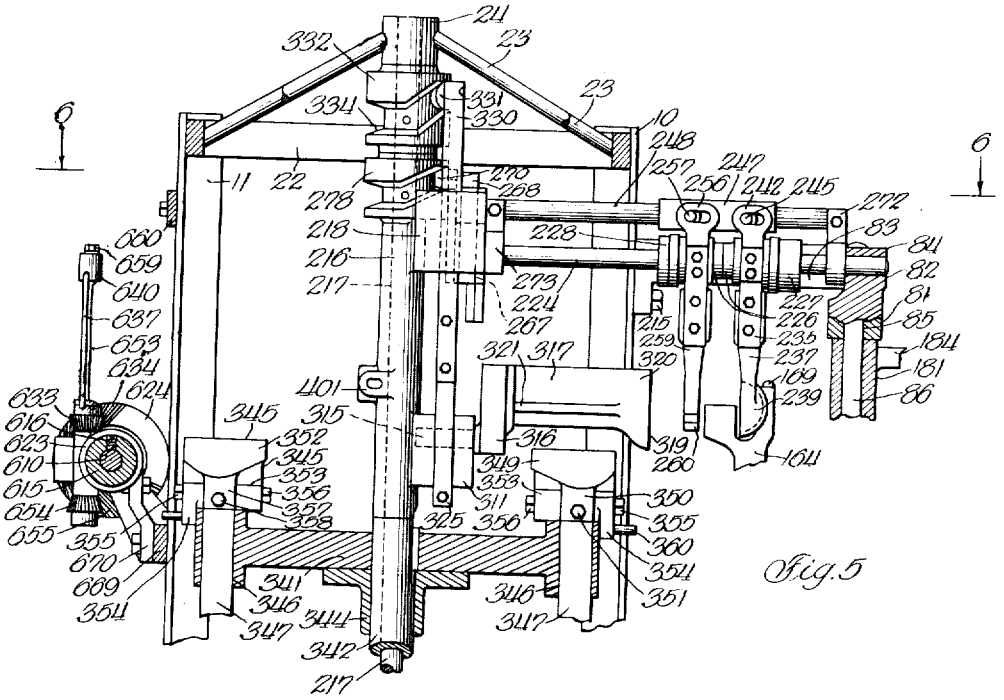
Figure 5 is a fragmentary sectional view of the upper portion of the machine shown in Figures 1, 2, 3 and 4 as taken through a vertical central section.

The arm 122 is actuated by a cam 125 keyed to the cam shaft 52. In one face of cam 125 is an eccentric groove 126 which circumscribes the shaft 52 (see Figure 4). A cam follower 127 having a roller bearing 128 projecting into groove, race or track 126 is mounted adjacent cam 125.

Cam follower 127 has a horizontal slot 129 which coacts with the shaft 52 to prevent vertical displacement of the cam follower. Such slot allowing a reciprocal movement to be imparted to follower 127 by the action of the side walls of the groove 126 upon the roller bearing 128. The cam follower 127 has adjacent thereto a second cam 130 which estops lateral movement of the follower 127 so that the roller bearing 128 cannot escape from the race in the cam 125.

The upper edge of the follower 127 comprises a narrow rib 131. Depending from the side wall of bearing 59 and attached by standard fastening means 132 is a guide bracket 133. The under side of the bracket 133 has therein a groove 134 that receives the rib 131 in a slidable manner.

One end of a link 135 is pivotally connected to a lug 136 at the forward end of the cam follower 127 by means of a bolt or pin 137 anchored in said lug. The opposite end of link 135 comprises a pin 141 that rides in a slot 138 at the end of an arm 139 that is keyed to a vertical shaft 140. The shaft 140 is journalled in bearings 76 and 142, the latter being in a block 143 secured to upright 13 by means of cap screws 144.

Vertical displacement of shaft 140 is prevented by using a sleeve 145 that is fastened to the shaft top by a machine screw 146. Sleeve 145 rides upon the upper face of the bearing block 143. On shaft 140 is an arm 147 held thereon by a set screw 148. The free end of arm 147 contains an eye 149 having a vertical axis.

A link 150 comprising an apertured head 151 is connected to arm 147 by pintle 152 extending through eye 149. A rod 153 having right and left hand threads at opposite ends is threaded at one end into lug 123 and at the other is threaded into link 150. A poly-sided section 154 is provided at the middle of rod 153 for its manipulation with a wrench.

A feed turret 155 having a hub 156 is mounted above the cam 116 upon the sleeve 87 and rotates with said sleeve. Radiating from the hub 156 are legs 157 at sixty-degree intervals. Each leg 157 terminates in an enlarged section 158. The several blocks are joined by integral strap members 159. A channel 160 of rectangular cross-section extends vertically through the blocks 158.

A stem 161 reciprocates in each of the channels 160, the cross-section of stem 161 corresponding with that of said channels. Members 161 have mounted at their lower ends inwardly directed brackets 162 having conical roller bearings 163 at their innermost ends. The bearings 163 are disposed within the groove or race of cam 116 and their coniform faces conform with the converging opposed faces of the upper and lower flanges 117 and 118.

A fruit cup 164 is secured to the upper end of each stem 161 by bolts 165. The several cups 164 are identical and generally comprise a casting. Each cup has a central seat 166 and at its sides members 167 and at its ends a member 168.

Each member 168 has at its top a seat for a ball bearing 169. Each cup 164 has a base 170 having a seat 171 centrally positioned relative to the cup, and a lug 172 extending downwardly from the side of said seat. The seat 171 is at the top of stem 161 and the lug 172 fits upon the side of said stem to be held thereagainst by a bolt 165.

Brackets 174 are held upon the outer face of the bearing blocks 158 by studs 173. Each bracket carries a roller bearing 175 rotating on a vertical axis between ears 176.

The belt pulley 25 is operated continuously. The cone clutch member 30, which is feathered to the main drive shaft 26, is controlled by lever 35. When the clutch is thrown "in," the main drive shaft 26 and the pinion 43 are rotated by the pulley 25. The pinion 43 actuates gear 53. The force imparted to the beveled pinion 106 is transmitted to gear 109 to turn the vertical shaft 105 and the sprocket 112 in a clockwise direction when looked at from above.

Roller chain 113, through sprockets 112 and 95, propels the spindle 92 clockwise. As the eccentric cam member 96 is rotated in a clockwise direction, the roller bearing 99 and projection 101 engage alternately the slots 90 and arcuate sections 91 of the Geneva gear 89. The circular body 101 coincides with each face 91 and slides thereagainst without imparting any rotary motion to the gear 89. As the member 96 is rotated, shoulder 104 reaches a point in alignment with the two vertical shafts 86 and 92 where there is no obstruction to an anticlockwise movement of the gear 89.

Simultaneously with such aligned position of shoulder or point 104, the roller bearing 99 contacts the forward edge of a slot 90. Continued rotation of the shaft 92 causes the roller 99 to project inwardly of such slot 90, thus imparting a rotary movement to the gear 89 (see Figure 19).

Subsequently, as the roller 99 is withdrawn from the slot 90, the shoulder 105 enters the next succeeding arcuate section 90. This arrests further rotation of the cam 89. Since there are six slots and arcuate faces in the Geneva gear 89, six advances and six stops will occur during each complete revolution thereof. The movement of the gear 89 causes a concurrent movement of turret 155.

The feed turret 155 and sleeve 87 rotate independently of the cam 116, the latter being actuated by the cam 125. The first movement of the cam 116 is in a clockwise manner and elevates the feed cup 164 whose stem 161 carries the roller 163 at the foot of incline 119.

Upward movement of the feed cup 164 is accompanied by the trimming of the stem from a pear therein. The return, or anticlockwise movement, of the cam 116 is had simultaneously with a shift of the feed turret, so that the roller 163 is kept upon the point 121 and hence the stem 161 in an elevated position.

*The stemming device*

Figure 6:
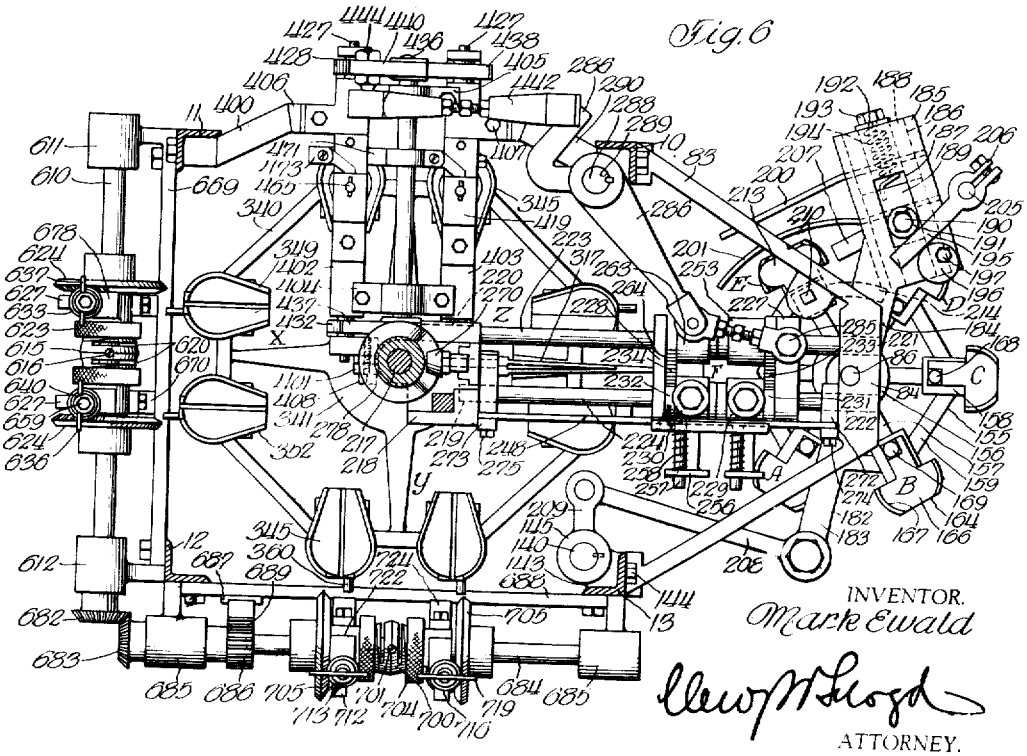
Figure 6 is a plan view of the machine taken in cross-section at the plane designated by the line 6—6 in Figure 5.

Vertical shaft 86, above the feed turret 155, has thereon a collar 180. A sleeve-like hub 181 depending from a lever 182 rides upon collar 180 in a manner free to pivot about the shaft 86. The arms 183 and 184 of lever 182 are at one hundred eighty degrees (see Figure 6).

The end of the arm 184 comprises a rectangular channeled block 185 angular to arm 184. A channel 186 is formed in the under face of block 185. A centrally disposed slot 187 extends through the top face of the block to the channel 186.

The channel 186, at either side and on the lower face of the block 185, is bordered by guide plates 188, held in position by any suitable means. Plates 188 project over the channel 186 to partially enclose it and to make a track of said channel. The guide plates 188 support for reciprocation within the channel 186 a cross head block 189. Block 189 has in its upper face a pin 190 that mounts a roller bearing 191, the pin 190 and bearing 191 projecting upwardly through the slot 187.

A plate 192 is fastened to the end of block 185 by a stud 193 and projects over the end of the channel 186. A spring 194 is inserted between the plate 192 and cross head 189 to constantly urge the cross head away from plate 192. Inward movement of cross head 189 is arrested by the roller 191 engaging a lever 195. The lever 195, which moves in an arc parallel to the upper face of the block 185, is limited in its movement under the influence of roller bearing 191 by an adjustable eccentric disc 196 which is anchored in block 185 by pin 197. By shifting the position of the disc 196 relative to pin 197, the inward movement of the block 189 may be regulated.

The lower face of the cross head 189 has thereon a boss 197*a* having a foot 198. Fastened by any suitable means to the bottom of foot 198 is a bracket 199. The bracket 199 supports at its lower end a second piece of sheet material comprising a stop 200. The stop 200 projects horizontally with the main body of said stop tangential to a circle generated about the turret shaft 86. The heel of foot 198 supports the shank of a flat arcuate blade 201 having a cutting edge 202.

An ear 203 having a vertical bearing 204 therein projects laterally from the side of the block 185. The bearing 204 supports a shaft 205 operatively connected to the lever arm 195 by the contraction of a split hub 206 at the end of arm 195. Between the ends of shaft 205 is a deformation in horizontal alignment with the feed cups 164, so that no interference will be had by shaft 205 with fruit in said cups as such fruit is conducted therepast. A second lever 207 is fastened to the lower end of the shaft 205 at an elevation in the same horizontal plane with the roller bearings 175. The extended end of the lever 207 projects into the arcuate path traversed by rollers 175 as said rollers are moved by the turret 155. The arm 183 of the lever 182 is operatively connected to the shaft 140 by a link 208 and an arm 209.

A stem 210 of polygonal cross-section is slidably mounted in a boss 211 integral with the frame 84. The lower end of stem 210 comprises a head 212. A plate 213 is secured to the bottom of the head 212, and a downwardly and inwardly curved finger 214 extends from the opposite side of said head. The finger 214 is disposed in the circular path traversed by the ball bearings 169. When the machine is used to treat fruit carrying stems, such as pears, the stemming device illustrated and described herein is used.

The stemming device operates in conjunction with the movement imparted to the feed cups by the cam 116. Pears are placed in the feed cups, with stems outermost, at any of the cup stations, A, B, C, or D. The first movement of the turret will advance the cup at station D to station E. Incident to the shift of the feed turret, the roller bearing 175 depending from the wall of the block 158 bearing the feed cup shifted from station D to station E comes in contact with the side of lever 207 to rotate the shaft 205 clockwise when viewed from above and to thereby force the cross head 189, through the agency of lever 195 and roller 191, toward plate 192 against the urge of spring 194.

Displacement of the cross head 189 concurrently moves the abutment plate 200 and the curved blade 201 therewith so that fruit carried in the feed cup moving from station D to station E will not abut the plate 200. Just before the cup advancing to station E attains such station, the roller bearing 175 passes the end of the arm 207. This allows the plate 200 to be moved in the opposite direction under the urge of the spring 194 until the plate 200 engages the end of a pear in the cup at station E. The plate forces such pear against the back member 168 of the cup 164. In this manner, the blade 201, which is adjustable in relation to the abutment plate 200, is measurably positioned from the end of a pear in the cup at station E.

As the feed cup moving from station D to station E is advancing, the ball bearing 169 thereon is supporting the head 212 because engaging the curved finger 214. As such cup advanced, the head 212 dropped coincident to the finger 214 presenting its upwardly inclined under surface to the ball 169. Downward movement of the head 212 under its own weight causes the plate 213 to rest upon fruit within the cup at station E. As fruit reaches the station E, it is thus firmly held within the cup by the pressure of plate 213, and by the pressure of abutment plate 200.

A counterclockwise movement is then given to the shaft 140 to move the lever 182 in a clockwise direction. This moves the circular cam 116 in a clockwise direction. The movement of the cam 116, as before stated, elevates the feed cup at station E.

Incident to the raising of the cup, the end of the pear therein is brought against the lower sharpened edge 202 of the arcuate blade 201, which is drawn, by the rotating of lever 182, to sever the stem end from the pear. During the upward movement of the fruit, the stem 210 bearing the head 212 is pushed upwardly within the boss 211.

As soon as the stem severing operation is completed, the turret 155 is given a turn by the Geneva gear 89 simultaneously with movement being imparted to the circular cam 116. The feed cup thus is advanced to station F in an elevated position. Before the fruit is conveyed entirely from under the plate 213, the ball bearing 169 on the finger 168 of the next succeeding cup is carried beneath the end of the downwardly curved finger 214 which prevents the plate 213 from being lowered into the path of the fruit subsequently to be disposed at position E.

*The fruit conveying carriage*

Fruit conveying means is provided shaped to conform to the general shape, size and character of the fruit to be processed in the apparatus.

A fruit conveying carriage is partially supported by the structure 84 having a cross member 82 connecting the ends of converging bars 83. The other ends of the members 83 are secured to the uprights 10 and 13 near their top by means of bolts 215. A further support for the purpose comprices a sleeve 216 surrounding a central vertical shaft 217.

Shaft 217 is free to rotate within sleeve 216. Integral with the top of the sleeve 216 is a boss containing apertures 219 and 220 that are in alignment with like apertures 221 and 222 in frame member 82. Tracks 223 and 224 are supported within apertures 219, 220, 221 and 222.

Figure 9:
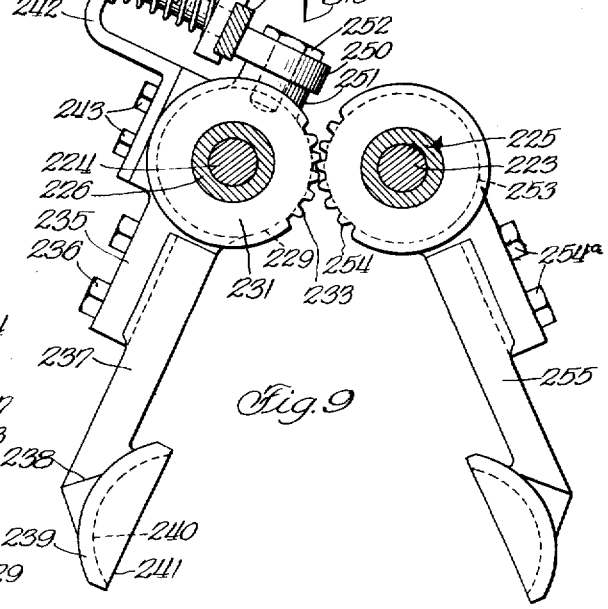
Figure 9 is an end view showing in detail the mounting and operation of complemental fruit carrying members.

A carriage reciprocates upon the tracks 223 and 224 and comprises identical sleeves 225 and 226 (see Figure 9). The sleeves 225 and 226 are connected at their ends by cross pieces 227 and 228 forming the front and back of the carriage. Rotatively disposed on the sleeve 226 are similar collars 229 and 230 that provide circular shoulders 231 and 232. The arcuate edges of the shoulders 231 and 232 have gear teeth 233 and 234 cut therein.

Projecting downwardly from the collar 229 is a bracket 235. A stem 237 of a fruit clamp 238 is secured to bracket 235 by studs 236. The lower portion of the clamp 238 comprises a scoop 239 having a concavity 240, and a heel 241.

Opposite to bracket 235, collar 229 has an offset bracket 242 secured by bolts 243. The bracket 242 contains an aperture 244. The end of a hinged rod 245 is loosely supported in aperture 244. The opposite end of the rod 245 which is pintled at 246 supports a shoe 247 having a longitudinal groove, which engages a slider bar 248. Positive contact between the shoe 247 and the slider bar 248 is had by means of a compression spring 249. The opposite side of bar 248 serves as a track for a roller bearing 250 rotatively mounted on a boss 251 having a bolt 252 projecting therefrom at the top of sleeve 229.

Upon the carriage rod 223 opposite to collar 229 is a component collar 253 having teeth 254 meshing with teeth 233. Secured to the collar 253, by means of cap screws 254*a*, is a fruit clamp 255 which is complemental and opposed to the clamp 238.

The collar 230 is operatively connected to the slider bar 248 in the same manner as the collar 229. A bracket 256 projects from collar 230, and has an aperture to receive an end of a pintled bar 257 upon which there is a compression spring 258 contacting the back of the shoe 247. The opposite end of the pintled member is inserted into the shoe 247. A clamp 259 is suspended from the collar 230 in exactly the same manner as clamp 238 is suspended from the collar 229.

The lower end of the clamp 259 comprises a curved jaw 260. Coacting with the clamp 259 is an opposed and identical clamp 261 with a jaw 262. A collar 263 rotatively mounted upon the sleeve 225 adjacent to the collar 253 supports clamp 261, and is operatively engaged to the shoulder 232 by means of gear teeth 264.

The boss 218 supports a shouldered panel 265 having therein a longitudindal slot 266. The slot 266 communicates through a groove 267 to the outer face of the panel. A staff 268 bearing near its upper extremity a pin 269 for a beveled roller bearing 270 is arranged for vertical reciprocation within the trackage formed by groove 267 and an opposed groove in the boss 218. Projecting from the side of the reciprocating member 268 through the slot 266 is a pin 271, the slot 266 being sufficiently extensive to clear the limits of reciprocation of said pin.

Figure 7:
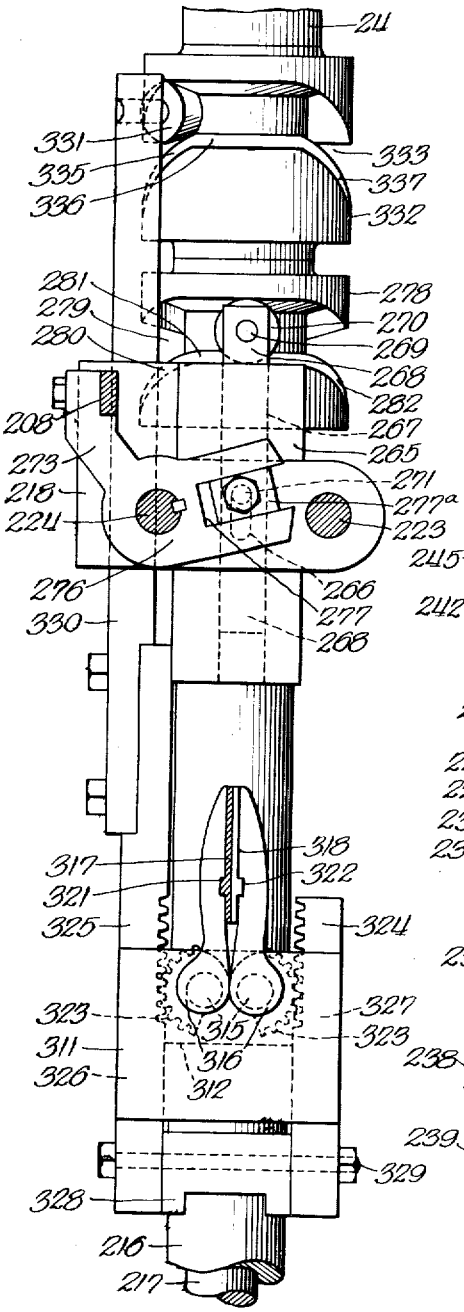
Figure 7 is a fragmentary view taken in elevation of the fruit splitting mechanism.

The slider bar 248 is carried at the ends of two levers 272 and 273 by means of studs 274 and 275, both levers being non-rotatively mounted on opposite ends of the track member 224. The lever 273, which is near the center of the machine, is compound and has in its arm 276 a slot 277 (see Figure 7). Within the slot 277 is a cross head 277*a* pivotally secured to the pin 271.

Secured to vertical shaft 217 above sleeve 216 is a circular cam 278 having a circumscribing camming groove 279 with an inclination 280 reaching an upper level at 281 and declining at 282. The beveled bearing 270 operates within the groove 279.

Figure 18:
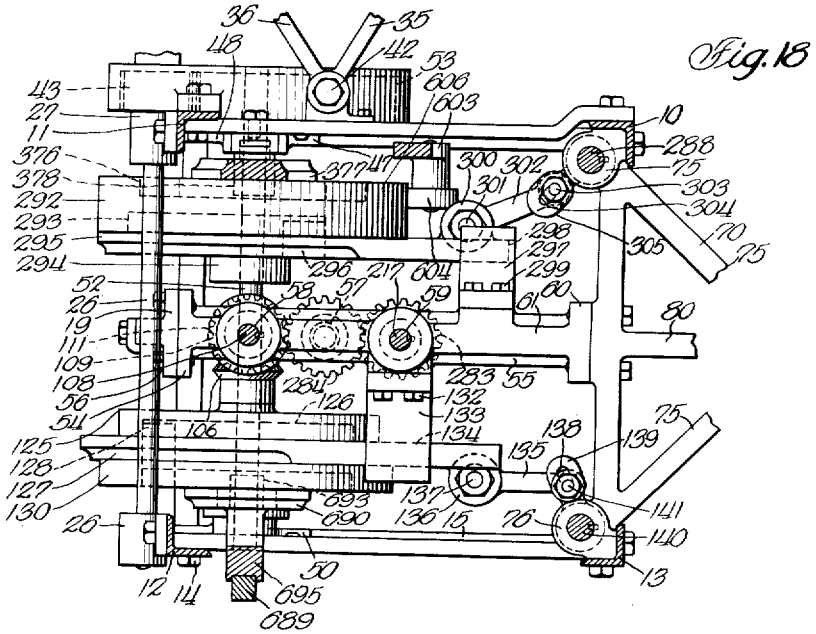
Figure 18 is a lateral and horizontal section taken through the machine as indicated by the line 18—18 of Figure 4.

Figure 18 illustrates the lower end of the shaft 217 journalled in the bearing 57. Shaft 217 has secured thereto a gear wheel 283 below the cross member 55. A gear idler 284 operating upon a stud shaft shrunk into bearing 57 serves to transmit the clockwise movement of the annular toothed member 111 to a like movement of the gear 283 and of shaft 217.

The front cross member 227 of the carriage has a threaded recess which receives a threaded stud shaft 285. The shaft 285 is connected to the bifurcated end of a compound lever 286 by an adjustable link 287. A vertical shaft 288 is journalled in bearing 75 and in a bearing 289 within the shank of the bracket 290 bolted to the upright 10.

Vertical displacement of the shaft 288 is prevented by the attachment of a lever 286 thereto at its upper end to bear against the upper face of the bearing 289. An integral offset hub 291 spaces the lever 286 above the bracket support 290.

Keyed to the cam shaft 52 is a plate cam 292. In one face of cam 292 is an eccentric groove 293 circumscribing the bearing for the shaft 52. A cam follower 295 is held adjacent to the face of the cam 292 by means of a collar 294 upon the cam shaft. Cam follower 295 has a horizontal slot for said cam shaft and supports a roller bearing 296 operatively contained by the groove 293.

A guide bracket 297 having a transverse groove 298 in its under face is secured upon the cross member 55 by means of bolts 299. The top edge of the cam follower 295 is guided within the groove 298 while it is reciprocated by the cam 292.

At the side of the cam follower 295 is an ear 300 which receives a vertical bolt 301. A link 302 is held above the head of bolt 301 and beneath the ear 300 in changeable angular position and has at its other end a wrist pin 303 in registry with a slot 304 near the end of a lever 305 fixedly attached to the lower end of shaft 288.

Fruit is removed from a cup 164 at station F by advancing the carriage to its foremost position upon the rods 223 and 224 with the jaws 237, 259, 255, and 261 in a spread position as illustrated in Figure 9. At such time, the slider bar 248 is moved upwardly and radially with the rod 224 from the action of lever 273. The vertical shaft 217 is rotated in a clockwise direction, therefore, when the carriage is in the forward position with its clamps about a fruit in a cup 164, the circular cam 278 is rotated to the position presenting the inclination 280 to the roller bearing 270. Continued movement of the circular cam 278 forces the inclination 280 beneath the roller bearing to elevate the bearing to the position shown in Figure 7. This movement will close the jaws about the fruit.

When the fruit has been grasped within the jaws 239, 260, 255 and 262, further movement of the circular cam 116 of the feed turret mechanism in a clockwise direction lowers the feed cup at station F. Concurrently, the cam follower 295 is moved by the plate cam 292 to impart motion to the linkage connecting with the cross member 227 of the carriage to move the carriage inwardly of the machine.

The upper plane 281 of the groove in circular cam 278 is of sufficient extent to hold the staff 268 in an elevated position long enough to maintain slider bar 248 in its downmost position while the carriage is moved inwardly of the machine. The inward movement of the carriage conveys the pear across a bit 317. The heels 241 of the fruit jaws 237 and 255 are behind the larger end of the pear and advance it inwardly against the slight resistance offered by the cutting edge 319 of the bit 317.

Fruit before being fed to the machine is generally graded to a standard size. In graded fruit, however, there are variations as to size and shape. The fruit clamps of the fruit conducting carriage, therefore, are closed in a semi-positive manner. As the fruit clamps come in contact with a pear, great pressure thereon is avoided by the springs 249 and 258.

Continued arcuate movement of the slider bar 248 after the fruit clamps have been arrested by contact with the fruit, will cause the roller bearing 250 to maintain the bar 248 against the shoe 247, thereby forcing the bar 245 through the aperture 244 against the urge of the spring 249. The rod 257 will be similarly displaced.

*The splitting mechanism*

A support comprising a boss 311 integral with the lower side of the sleeve 216 is provided for the splitting members 316. The boss 311, from left to right, has a channel 312, opening to the top and the two said sides of the boss. Bearings 313 and 314 are arranged in alignment in the front and rear walls of said boss. Shafts 315 are journalled in said bearings and extend across channel 312 and support at their free ends the members 316.

Figure 8:
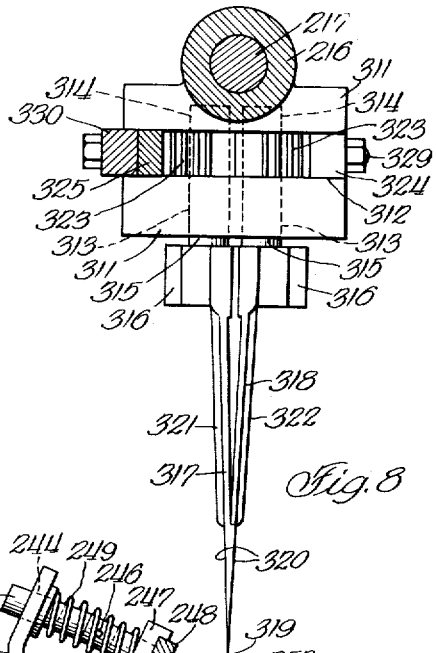
Figure 8 is a perspective view of the splitting blades as taken from above.

The left member 316 (Figures 7 and 8) has a bit 317 extending forwardly in alignment with the paired leaf or member 318 supported by the right member 316. The bit 317, at its forward end, has a cutting edge 319. Shoulders 320 recede therefrom at an acute angle. The outer side of the bit 317 and the complemental leaf 318 have horizontally disposed bosses 321 and 322, respectively. The bosses 321 and 322 prevent a vacuum forming between the faces of the leaves 317 and 318 bearing said ridges and the flat sides of a halved pear.

The shafts 315, across the channel 312 have segmental pinions 323 keyed thereto for engaging racks 324 and 325. The rack 325 extends downwardly through a guide slot 326 in the boss 311 to a position below said boss. The rack 324 operates in a slot 327 on the opposite side of the boss 311 and also extends therebelow. A cross piece 328 connects the two racks 324 and 325, a bolt 329 being used to hold the several parts in assembly. A vertical connecting rod 330 offset from the rack 325 extends upwardly through a guide therefor in the boss 218. The upper end of the rod 330 has thereon a truncated roller bearing 331 mounted on a stem normal to said rod.

Intermediate the central crown bearing 24 rotatively mounting the upper end of the drive shaft 217 and the circular cam 278 is a collar cam 332. The cam 332 has a peripheral groove 333 having a lower section 334 and an inclined section 335 extending upwardly from the lower section 334 to a higher section 336. Succeeding the higher plane 336 is a declination 337 to the lower plane 335. The circular cam 332 rotates with the shaft 217.

The shaft 217 rotates in a clockwise direction, hence the fruit clamps of the fruit carriage will be spread to release the fruit after having carried such fruit past the cutting edge 319 and over the faces of the bits 317 and 318 and before the parts 321 and 322 are spread by the operation of the roller bearing 331 within the declining section 337 of the groove 333. Nothing, therefore, impedes the outward displacement of the two halves of the fruit when the hinged members 321 and 322 are spread apart to deliver such halves to fruit cups therebelow.

*The main turret*

A main turret 340 comprising an octagonal figure is disposed at the center of the machine. The turret 340 has a central hub 341 non-rotatively engaging a sleeve 342. The sleeve 342 has a flanged upper end 344 which is attached to said sleeve to prevent a longitudinal displacement of the turret. The sleeve 342 surrounds the shaft 217 and extends downwardly to rest upon the cross member 55 at bearing 59. The shaft 217 moves freely within the sleeve 342.

Spaced about the edge of the turret 340 are fruit cups 345. The cups 345 are arranged in pairs. An intermittent ninety degree at a time movement is given to the turret stopping it with the four pairs of fruit cups at the stations marked W, X, Y, and Z.

Each of the eight corners of the feed turret 340 has therein a vertical bearing 346, rectangular in cross-section. Stems 347 of the same cross-section vertically reciprocate within said bearings. The inner edge of the stems 347 has therein a notch 348. A half 349 of a fruit cup, having a lug 350 extending downwardly along the side of the stem 347, is mounted at the top of each of said stems. A stud bolt 351 passes through the lug 350 and the stem 347 for attachment therebetween. The half cup 349 has a concavity conforming to the periphery of a half of a pear having its stem end inwardly of the machine. A cup segment 352 having a concavity complemental to that in segment 349 is mounted opposed to each segment 349.

Figure 22:
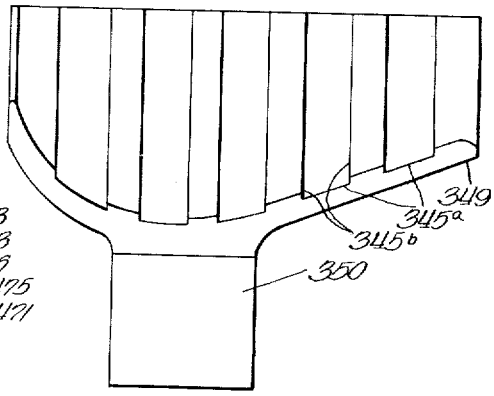
Figure 22 is an elevation of the inner wall of one of the elements of a fruit cup.

Shallow grooves 345*a* are formed in the cup segment walls. The grooves are bounded by vertical sides 345*b* (see Figure 22). Pressure on the fruit as it is peeled forces sections of it into the grooves 345*a* resulting in less frictional impedance to the passing of a paring knife through the fruit.

The cup segment 352 is movable and has depending from its inner and outer ends abutments 353 and 354 that fit closely upon the two sides of the stem 347 and contain aligned apertures which coincide with recesses in the adjacent sides of the stem 347. Bolts 355 and 356 are disposed in said apertures and recesses and the movable segment is free to oscillate thereabout. A second depending lug 357 projects downwardly from the cup segment 352 offset from the stem 347.

The lower end of lug 357 has a threaded aperture for a bolt 358 which is screwed inwardly until its threaded end abuts the stem 347. The center of gravity of the cup segment 352 is such that it tends to rotate about the bolts 355 and 356 to thus spread the cup members slightly apart. The bolt 358 being below the pivot of the movable segment 352, it may be adjusted to determine how far the segment 352 may be spread from segment 349.

A lock nut 359 may be used to hold the bolt 358 in place once the desired adjustment is made. Projecting from abutment 354 is a pin 360. Displacement of the pin 360 to the right, Figure 2, will move the cup segment 352 toward cup segment 349.

Intermittent ninety degree movement of the turret is had through a Geneva gear 361 secured to the lower end of the sleeve 342. The cam 361 comprises a plate having alternately spaced about its periphery four slots 362 and four arcuate peripheral sections 363. The slots 362 and arcuate sections 363 are separated by point 364. Keyed to the shaft 108 in a parallel plane below the Geneva gear 361 is a generally circular plate 365.

A section 366 of plate 365 is eccentric and has a periphery 367 generated about the axis of shaft 108. There is a generally circular cam plate 368 upon plate 365 within the plane common to the Geneva gear 361. The plate 368 has a section removed leaving a concave curved edge 369. Shoulders 371 and 372 mark the intersection of the concave edge 369 and the circular edge 370 of the cam 368. A slot 373 is formed in the lug 366. It extends inwardly beyond an imaginary line indicating continuity of the circular edge 370. A stud 374 having thereon a roller bearing 375 rides in slot 373.

The roller 375 and the cam plate 368 operate with respect to the slots 362 and arcuate faces 363 of the cam 361 in the same manner as the similar parts previously described function in the operation of the Geneva gear movement of the feed turret. In the main turret, there are but four slots about the cam 361, hence, the cam is turned ninety degrees during each actuation.

Such intermittent motion of the fruit turret allows the fruit cups to remain in each of the stations W, X, Y, or Z a predetermined period of time in seriatim.

A circular plate 365*a* having a flange 365*b* and a groove 365*c* is mounted about shaft 108 above the cam 368. The plate 365*a* is held stationary by a strap brace extending between the frame members 11 and 12. The groove 365*c* has a contour for guiding the stub shaft 374 and the roller 375 into and out of the grooves 362 by sliding the stub shaft 374 in the slot 373. A roller (not shown) upon the shaft 374 above the roller 375 rides within the groove 365*c*.

In the upper face (Figure 3) of cam 292 is an eccentric groove 376 circumscribing the aperture in said cam for the reception of cam shaft 52. A cam follower 377 having a vertical slot 378 therein for freedom of movement about cam shaft 52 is disposed against cam 292. Cam follower 377 carries a stem 379 having thereon the roller 378*a* projecting into the groove 376.

The cam follower 377 extends upwardly and has an arm 380. The arm 380 supports two vertically disposed posts 381 spaced apart an interval equal to the space between the pairs of stems 347 supporting the fruit cups. Posts 381 are held in place in an adjustable manner by nuts 382 and project upwardly through apertures 383 in the hood 384, which is a continuation of hood 94.

Figure 3:
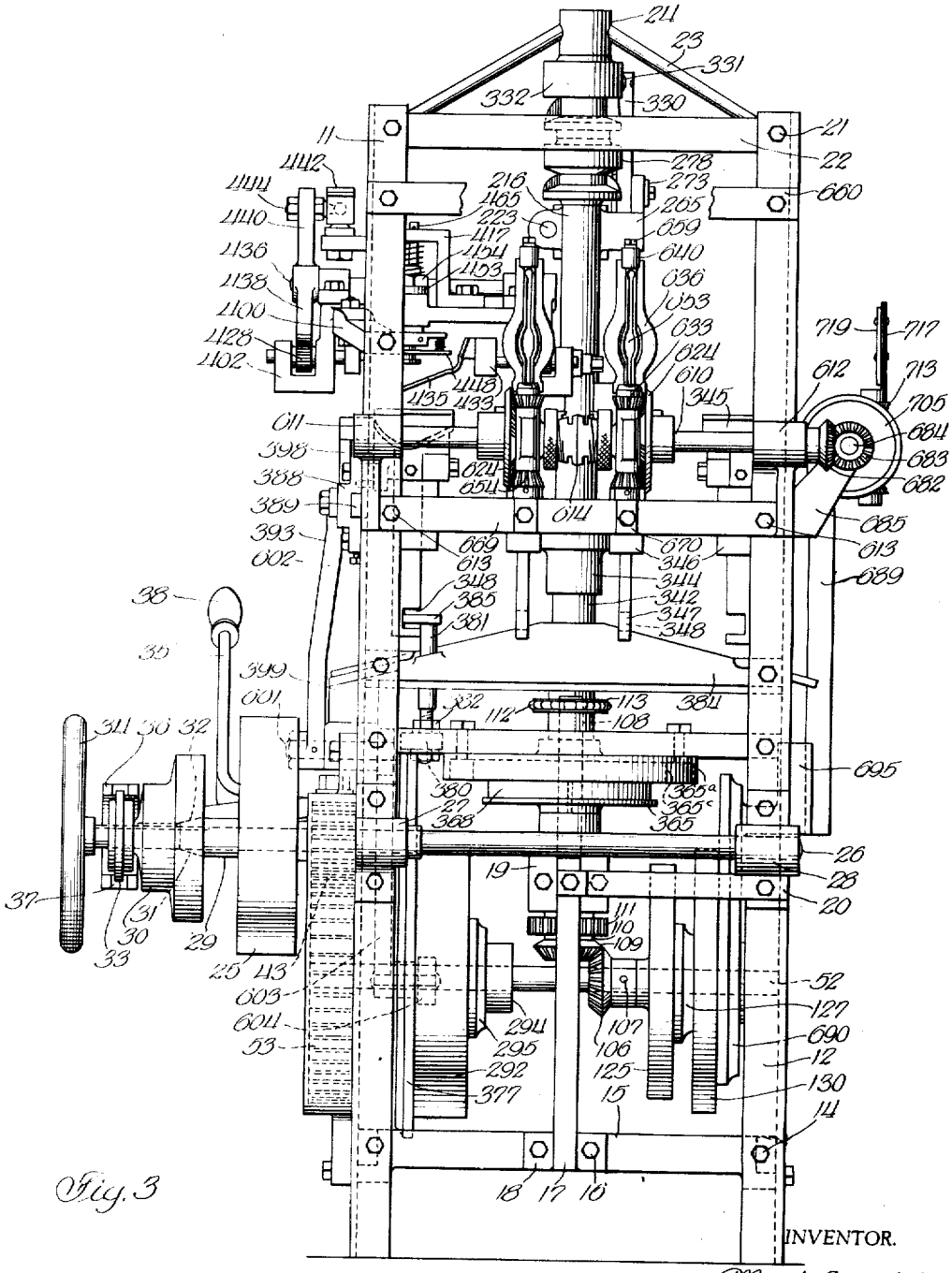
Figure 3 is an elevation of the same machine as viewed from the rear.

The tops of the posts 381 are held together by a cross-piece 385 which projects outwardly as illustrated in Figure 3. The posts 381 are adjusted so that the cross bar 385 is in the same horizontal plane as the slots 348 in the stems 347 when said stems 347 are in their lowermost position.

The posts 381 are at station W. As the turret advances a pair of fruit cups to this station, the cam 292 elevates the cam follower 377 to raise the horizontal arms 380 and the posts 381 thereon, thus elevating the fruit cups as the cross piece 385 is in registry with the slots 348 in stems 347.

*The fruit cup closing mechanism*

The uprights 10 and 11, at an elevation with that of the fruit turret, have thereon brackets 388. A bar 389 is loosely held between the brackets 388 and is horizontally reciprocable within said supports. A hook 390 is secured to upright 10 and on the bar 389 adjacent thereto is a pin 391. Between the pin 391 and the hook 390 is a contraction spring 392 which holds the bar 389 in a position limited by the bifurcated end of a lever 393 which bears against the bolt or pin 394 in said bar.

On bar 389 at each side of the bolt 394 are similar levers 395. The levers 395 are held in a given angular position by the adjustment of a screw 369a and a lock nut 396 and ride upon bolts 397. The upright arms 398 of the levers 395 are spaced apart a distance equal to the space between the paired fruit cups in the feed turret and are in the same vertical plane as the pins 360 projecting to the left of the movable element of the fruit cups.

Figure 19:
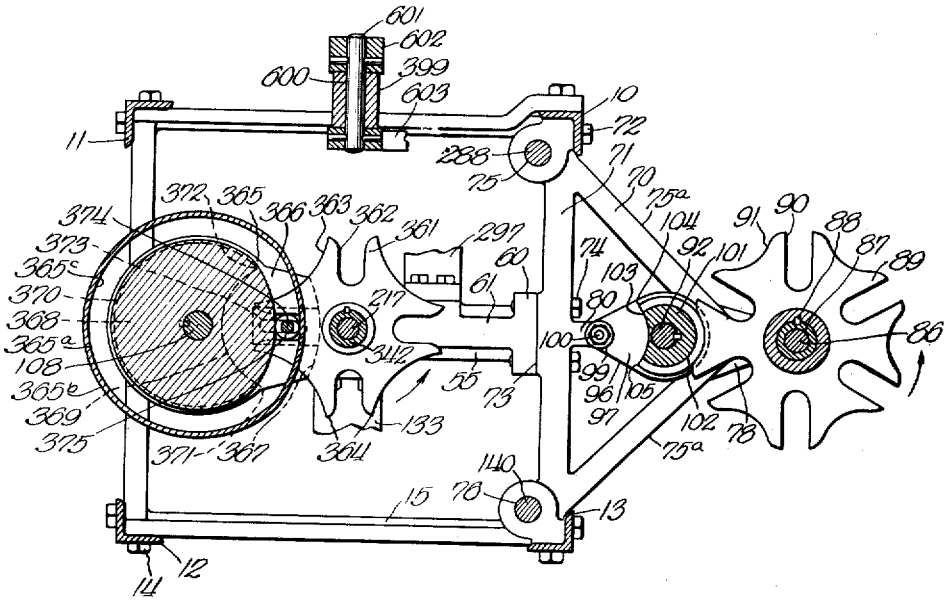
Figure 19 is a transverse section taken through the machine as indicated by the line 19—19 of Figure 4, showing particularly the Geneva cam used therein.

Depending from the right central edge of the hood 384 which is supported by the four corner uprights 10, 11, 12 and 13 is a lug 399 having at its lower extremity a horizontal bearing 600 (see Figure 19).

The bearing 600 supports a fulcrate member 601 having pinned to its opposite ends the upper and lower arms 602 and 603, respectively, of the lever 393. The lower end of arm 603 is forked and between the opposed parts of the fork mounts upon an axle 605 a roller bearing 604. The circular plate cam 292 has upon its periphery a shoe 606. The roller bearing 604 engages the periphery of the cam 292 and is maintained in one position until the shoe 606 displaces it to oscillate the lever 393 about its pivot 601. When the curved shoe 606 has passed beneath the roller 604, the bar 389 is restored to its normal position by the spring 392.

Displacement of the bar 389 in the manner described forces the upright arms 398 against the pins 360. Movement of the pins 360 closes the cups 345. The closing of the cups occurs during the peeling movement of a paring blade 435.

Adjustment of the machine for different thicknesses of peeling may be had by changing the position of the screws 369a. Screws 369a may be turned so that arm 398 will engage pins 360 to but partly close the cups. This will result in paring of a thicker peel as the path of blade 435 is about a fixed axis concentric with the cup when the latter is tightly closed.

*The peeling mechanism*

At station W a support for a peeling mechanism is provided by brackets 290 and 400 which are secured to the uprights 10 and 11, respectively, and by an apertured lug 401 projecting from the sleeve 216.

The support includes frame members 402 and 403 which are identical and are connected by aligned journal members 404 and 405. Lugs 406 on the frame members 402 and 403 facilitate attaching the brackets 290 and 400 by bolts 407. The end of frame member 402 abuts against the lug 401 to align a threaded hole therein with an aperture of said lug for a stud 408.

The outermost ends of the members 402 and 403 comprise a transverse channel 409. The outer and inner walls of said members at opposite sides of the channel 409 contain aligned bearings 410 and 411, respectively. The inner wall extends upwardly and has seated thereon the ends of the journal member 405.

The frame members 402 and 403 have a second pair of transversely aligned channels 413. In channels 413 are bosses 414 having a smooth top end 415 and a central aperture 416 which extends vertically through the boss. A Z shaped bracket 417 is held upon the top face of each member 402 and 403 by a stud 418. The horizontally disposed section 419 of the bracket 417 has an aperture 420, the axis of which coincides with that of aperture 416. To the top of a wall 421 comprising a side of a channel 422, bearing member 404 is fastened by cap screws 423. A vertical wall 424 at the inner end of each of members 402 and 403 form the other side of the channel 422. Bearings 425 and 426 are formed in walls 421 and 424 and have aligned axes.

A shaft 427 is rotatively disposed within the bearings 410 and 411, and has keyed thereto within the channel 409 a gear 428. The inner end of the shaft 427 has fastened thereto a collar 429 having an angular lug 430. A shaft 431 is disposed in bearings 425 and 426 and has keyed thereto a pinion 432 riding in the channel between the walls 421 and 424. Shafts 427 and 431 are in alignment. The end of shaft 431 carries a collar 433 having a lug 434. The lugs 430 and 434 are opposed. Supported by the lugs 430 and 434 is a paring blade 435 which has the shape of the longitudinal periphery of one side of a pear.

The journals 404 and 405 house a shaft 436. The inner end of the shaft 436 has fixedly attached thereto a segmental gear 437 which engages the gears 432. The opposite end of the shaft 436 has keyed thereto a segmental gear 438 which meshes with the pinions 428. An arm 440 extends radially from a hub 441 of the gear 438 and is operatively engaged by an adjustable link 442, there being a slot 443 in arm 440 and a pin 444 extending through said slot into an end of link 442.

The opposite end of the link 442 has a socket 445 for receiving a ball 446 mounted upon a post 447 whereby a ball and socket connection between the link 442 and the end of lever 286 is completed. The intermittent oscillating movement of vertical shaft 288, heretofore described, is transmitted through the link 442 to the segmental gear 438 and thus to shaft 436 and segmental gear 437.

The shafts 427 and 431 are actuated independently so that equal torque is applied to both ends of blades 435. The angle of oscillation imparted to the segmental gears is such that a blade 435 is rotated more than one hundred eighty degrees from one position slightly above the horizontal to another position slightly above the horizontal in a counterclockwise direction.

While the blades 435 are in a position to make a cutting movement, fruit cups containing half pears which have arrived at the station W are elevated by the posts 381 in the manner heretofore described, thus to bring the flat faces of the halved fruit upward against pear peeling pads 448 where the fruit is maintained while the peeling operation of the blades is performed. The blades 435 pass through the fruit just under the epidermis, the fruit and detached epidermis remaining in the cups.

The vertical aperture 416 in the boss 414 telescopingly receives a hollow stem 449 having an enlarged head 450 at its bottom. The opening 451 within the stem 449 is cylindrical and is coextensive with the stem and the head 450. It is of decreased diameter above a shoulder 452 therein. After the stem 449 has been inserted into the aperture 416 from beneath, a collar 453 and a nut 454 are respectively shrunk and screwed upon the upper and threaded end of said stem. The stem 449 is constantly urged downwardly by a compression spring 455 exerting a force between the horizontal arm 419 of the bracket 417 and the nut 454, the limit of downward movement being governed by collar 453. The tension of the spring 455 may be regulated by moving the nut 454 relatively to the collar 453.

Adjacent the opening 451 within the head 450 is a recess 456 enclosed by opposed walls 457. The walls 457 contain aligned apertures 458 forming bearings for a pin 459 which supports intermediate the walls 457 a lug 460 integral with the pad 448. Protruding from the head 450 is a tongue 461 having a lug 462 projecting downwardly therefrom.

Figure 10:
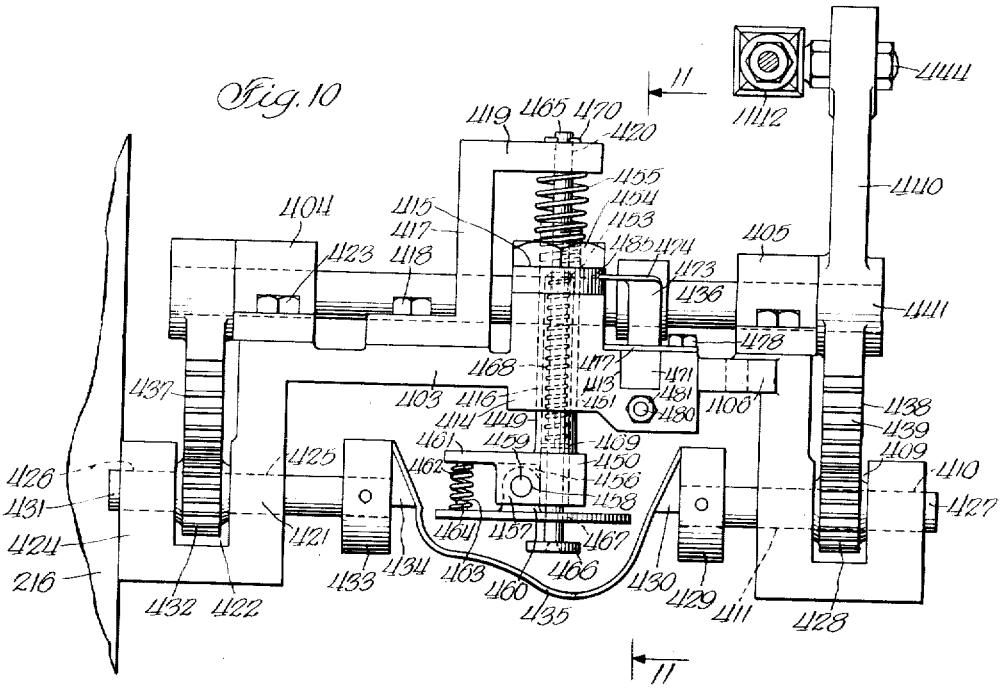
Figure 10 is a fragmentary view of the machine illustrating in side elevation the peeling mechanism.

Between the lug 462 and a lug 463 on plate 448 is a compression spring 464. Extending upwardly through the opening 451 is a stem 465 having at its lower end a knock-out pad 466 of dimensions allowing it to be seated within the recess 467 in the fruit pad 448. When no contrary pressure is exerted upwardly upon the knock-out pad 466, the stem 465 is maintained in the downward position illustrated in Figure 10 by a compression spring 468 seated against the shoulder 452 and pressing against a pin 469 extending through the stem 465. The downward displacement of the stem 465 and the pad 466 is limited by a transverse pin 470 contacting the top of the bracket 417.

A bar 471 is slidably seated within the channal 413 of the two frame members 402 and 403. A transverse slot 472 is disposed in the bar 471 about midway of its two ends. The top face of the bar 471 carries two similar lock members 473 having horizontally disposed jaws 474 and flanges 475 in parallelism with said jaws and serving as a means for anchoring said members with set screws 476. A plate 477 held in place by a stud 478 extends over the channel 413 in the frame member 403. An aperture 479 in frame member 403 seats a pin 480 threaded upon its forward end to receive nuts 481. The other end of the pin contains an aperture 482. A screw 483 holding beneath its head one end of a contraction spring 484 is mounted on the under side of bar 471 and the other end of said spring is hooked within the aperture 482.

The spring 484 provides a constant pull upon the bar 471, thus tending to keep the bar in a position limited by the plate 477 engaging the base 475 of the foremost lock 473. When the bar 471 is in its most forward position, the jaws 474 of the locks engage a groove 485 within the collars 453 and thus prevent any upward movement of the fruit pads 448.

Figure 11:
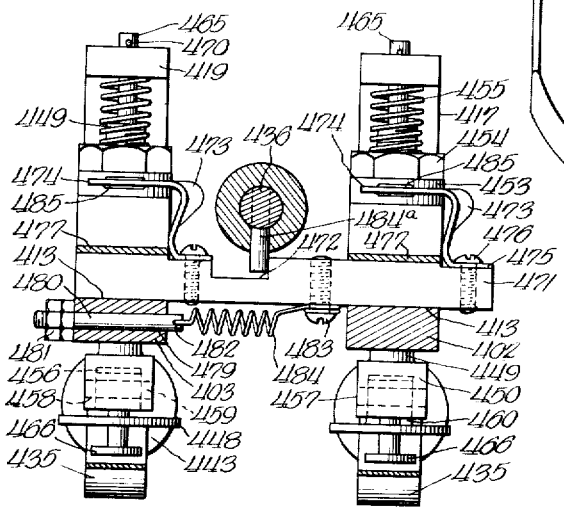
Figure 11 is a vertical cross-section of the peeling mechanism taken at the line 11—11 of Figure 10, with certain parts omitted.

The shaft 436 carries a radial peg 484*a*. Normally the peg 484*a* exerts a pressure upon one wall of the notch 472 and prevents a movement of the bar 471, hence the jaws 474 may not engage the grooves 485. The clockwise rotation of the shaft 436 (Figure 11) frees the pin 484*a* from the notch to permit the spring 484 to urge the jaws 474 into engagement with the grooves 485. Release of the bar 471 by the pin 484*a* occurs while the paring knife is making its upward stroke through the fruit. The jaws 474 thus positively hold the fruit pads 448 against upward movement during upward movement of the paring knife.

Subsequently, the peeled fruit is lowered as the fruit cup is dropped by a movement of the cam 292. As the fruit cup drops, the knock-out pad 466 presses the fruit away from the face of the pad 448. The knock-out pad 466 breaks any vacuum created between the flat face of the fruit and the fruit pad that would cause the fruit to adhere to such fruit pad. The spring 468 actuating the knock-out pad is of a strength sufficient to push the fruit from the fruit pad, but is not stiff enough to injure the fruit when such fruit forces the pad into the seat 467 incident to the rise in the fruit cups.

*Means for severing the seed-carrying portion of the half fruit*

After fruit has been pared at station W and the fruit cups have been lowered, the main turret is advanced ninety degrees to station X.

In the illustration of the invention of the method and apparatus as applied to the treatment of half fruit, I have shown the same as applied to the treatment of pears and therefore the means for removing the seed-containing portion is illustrated as a coring mechanism.

A coring device is mounted upon a shaft 610 which oscillates within end bearings 611 and 612 secured respectively to the uprights 11 and 12 by bolts 613. The shaft 610 has a clutch member 614 which is compound in nature and symmetrical on either side of a central integral sleeve 615. The sleeve 615 is fastened to the shaft 610 by a set screw 616.

Short ligatures 617 connect split sleeves 618 to the collar 615. The sleeves 618 are split as indicated at 619 (Figure 15) and are separated from the collar 615 by a narrow slit 620. The split sleeves 618 have a uniform increase in outside diameter from the outer edge 621 inwardly to the crown 622 on the collar 615. The outer surface of the sleeves 615 is threaded and has engaging the threads a collar 623. The inside diameter of the sleeves 618 is uniform and slightly greater than the diameter of the shaft 610.

Bevelled gears 624 are keyed to the shaft 610 on either side of the sleeves 618 and comprise an offset hub 625 in which is a set screw 626. A multiple bearing member 627 (Figure 16) is rotatively mounted upon the shaft 610 intermediate the gear 624 and the adjacent split sleeve 618. An internal clutch member 628 projects from the bearing member 627 and telescopes into the sleeve 618. The multiple bearing block 627 has therein a bearing 629 for shaft 610. The bearing block 627 is not secured to the shaft 610 but may rotate freely thereabout. Block 627 has a second bearing 630, the axis of which is normal to the axis of the bearing 629. Bearing 630 supports for rotation a hollow spindle 631. The inner end of spindle 631 has thereon a circular shoulder 632 with teeth 633 cut therein.

Figures 20, 21:
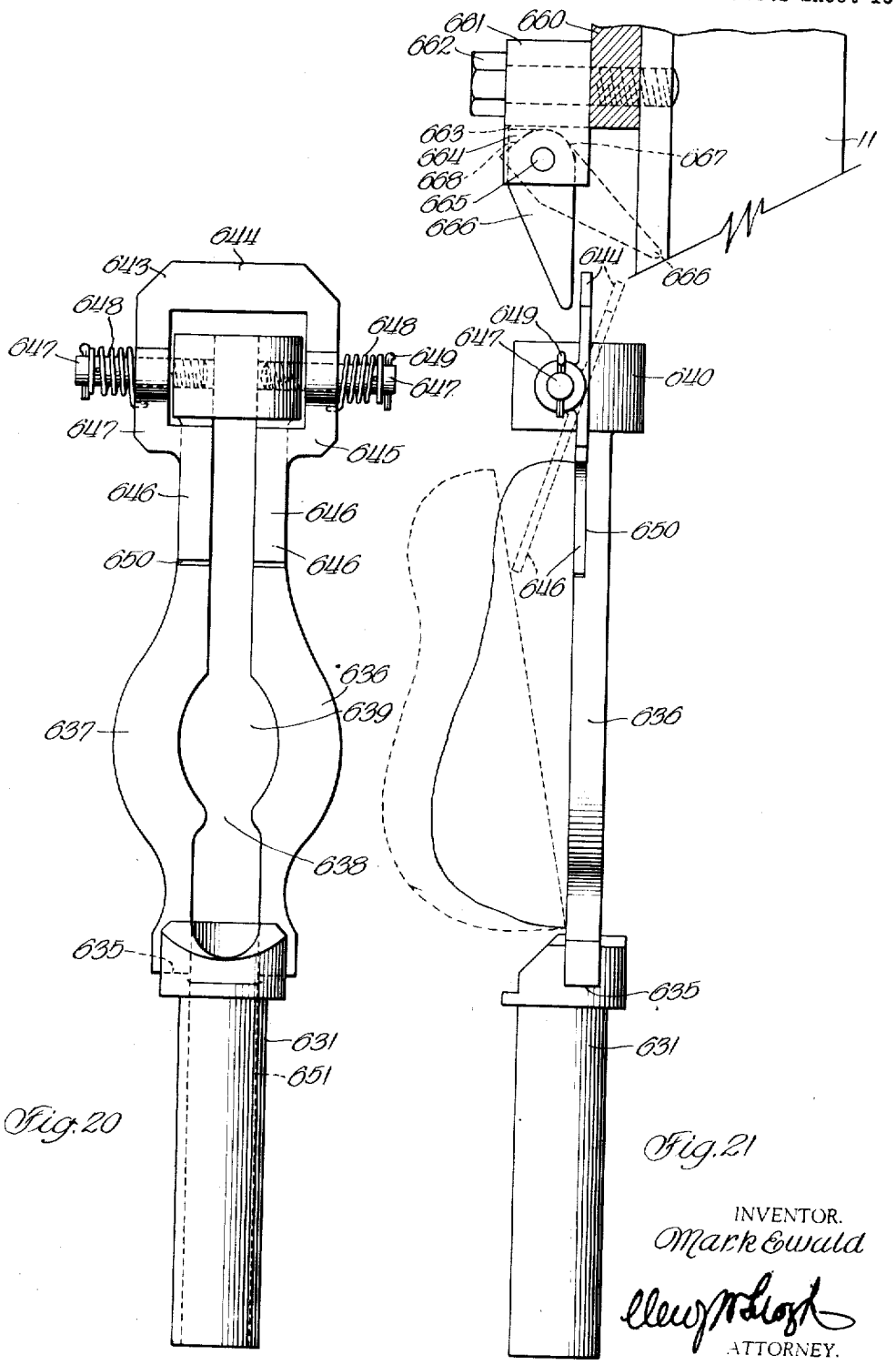
Figure 20 is a plan view of the front face of a paddle.
Figure 21 is a side view of such paddle illustrating the ejecting device herein described.

Engagement is had between teeth 633 and an arcuate train of teeth 634 in the beveled gear 624. The extreme inner end of the spindle 631 has a groove 635 which seats the ends of two curved fruit-contacting, holding and turning members 636 and 637. The members 636 and 637 are substantially symmetrical and have top faces that are flush and of the shape of the flat face of a half fruit. The opposed inner edges of the members 636 and 637 are spaced apart and extend from the inward end of the spindle 631 in parallelism until a restricted section 638 is reached. Beyond the restricted section 638, the space between the two members 636 and 637 is first increased and then decreased to form an enlarged section 639. The space between the members 636 and 637 thereafter is uniform (Figure 20).

The members 636 and 637 thus comprise auxiliary fruit holding means which is adapted to contact the cut face of the half fruit on opposite sides of the seed-containing section, providing therebetween an opening registering with the seed-containing section through and in which the severing mechanism is operable.

The inner ends of the members 636 and 637 are connected by a block 640 having therein a bearing 641 on an axis common to the spindle 631. The bearing 641 is intersected by a second bearing 642 at ninety degrees thereto. A flat U-shaped plate 643 having a closed side 644, opposed legs 645 extending outward therefrom, and extensions 646 upon the sides 645, is supported by stud shafts 647 anchored within the bearings 642.

Springs 648 at one end are anchored to a pin 649 at the ends of the shafts 647 about which they extend, and at their other ends engage one face of side members 645 to rotate the U-shaped plate 643 about the shafts 647 to maintain the extensions 646 flush with the members 636 and 637. The members 636 and 637 have a part of their top faces removed to form a seat 650 in which the extensions 646 may lie so that the faces of members 636 and 637 and extensions 646 are normally in a single flat plane.

The spindle 631 contains a bearing 651 coextensive with the spindle. Bearing 651 contains a shank 652 of a coring blade 653. The outer end of the shank 652 is keyed to a beveled gear 654. The face of the gear 624 contiguous to the gear 654 contains a second train of teeth 655 which mesh with those upon the gear 654.

Any suitable type of coring means may be provided to accomplish the objects herein attained and which will function in the manner equivalent to the preferred form of coring means herein illustrated. However, I prefer to provide as a coring means an arcuately shaped cutter adapted to turn about an axis which is substantially the same axis about which the half fruit turns.

The blade 653 has a semicircular cross-section transversely of and throughout its length. It will be noted that the coring means is provided with an intermediate portion of arcuate formation which in cross-section is substantially one-half the general cross-sectional area of the core portion of the fruit to be cored and that regarding Figure 15, the lower portion of the coring means is wider than the upper portion of the coring means. The coring means is shaped in this manner to attain predetermined effects. The outermost end 656 of the blade 653 is secured to the shank 652. The blade 653 operates on an axis centered in the shank 652 and in the bearing 641, such axis lying intermediate the members 636 and 637 in a plane approximately in alignment with the top faces of said members. The inner end of the blade 653 terminates in a trunnion 657 which extends into the bearing 641 for rotation therein. A washer 658 held upon the ends of the trunnion 657 by a bolt 659 cooperates with the pinion 654 to prevent axial displacement of the shank 652 and the blade 653.

Between uprights 11 and 12 there is a transverse bar 660 which supports two blocks 661 secured by stud bolts 662. The under side of the blocks 661 contains a notch 663. The walls 664 at the sides of the notches 663 support a pin 665 about which a sprag 666 is pivoted. The sprag 666 has an arcuate edge 667 concentric of the pin 665 and of a radius which will not contact the material of the block at the base of the channel 663. The arcuate section terminates in a tangential face 668 which abuts the material of block 661 to prevent an outward pendulant movement of the sprag 666. The sprag 666, therefore, is adapted to swing freely inwardly of the machine but is arrested in its outward movement. The sprags 666 are in alignment with the coring instrumentalities and particularly U-shaped member 644.

A cross piece 669 is secured to uprights 11 and 12 as a base for offset lugs 670 that are in alignment with the bearing blocks 627 of the coring mechanism. The lugs 670 at the offset sections 671 present a top face 672 and an outer face 673. A bolt 674 extends through the outer face 673 and under the head 675 of the bolt a number of washers 676 may be placed to space the head 675 from the face 673.

The under face of the bearing block 627 on either side of the bearing 629 has shoulders 677 and 678 that coact respectively with the head 675 of the bolt 674 and the top face 672 of the bracket 670 to limit the oscillative rotation of the block 627.

The coring mechanism is actuated by an oscillatory movement of shaft 610. The left end of the shaft 610 beyond the bearing 612 has keyed thereto a bevel gear 682. The gear 682 is meshed with a second gear 683 at the end of a horizontal shaft 684 within bearings 685. The shaft 684 carries a spur gear 686 which engages a vertically reciprocating rack 689 guided by a plate 687 attached to a cross member 688 between uprights 12 and 13.

A cam follower 690 containing a vertical slot 691 for the reception of cam shaft 52 is disposed at the right side of the cam 130 (Figure 3). The right side of said cam 130 contains an eccentric groove 692 providing a track for a roller bearing 693 supported upon a pin 694 projecting from the left side of the cam follower 690. The cam 130 is rotated by the shaft 52, and the groove 692 by its engagement with the roller bearing 693 guides the cam follower 690 in a vertically reciprocal manner. A bracket 695 connects the cam follower 690 and the rack 689 to impart reciprocal motion to the latter. An oscillating motion of shaft 610 is produced through the rack 689, the gear 686, and the pinions 683 and 682.

As the rack 689 is moved downwardly, the shaft 610 is rotated in a clockwise direction when viewed from its left end. The clockwise movement of the shaft 610 and the gear 624 rotates the coring mechanism in a like direction and brings the flat face of the members 636, 637 and 646 to bear upon the exposed face of the fruit within the fruit cups at station X. The coring blade 653 is in the position illustrated in Figure 17 with its main body retracted within the space between the members 636 and 637 and with its cutting edges 680 and 681 against the fruit. When the coring apparatus is at the position described, the gear train 634 is in engagement with the teeth 633 of the section 632 at its most advanced end. The shoulder 678 at this time is against the face 672 of bracket 670 to prevent further rotation of the block 627 about shaft 610.

The gear 624 continues its clockwise movement and a rotary movement will be imparted to the spindle 631 by the gear 634 whereby the members 636 and 637 rotatively discharge the fruit from the fruit cup, such discharged fruit normally remaining upon the flat faces of parts 636, 637 and 646 after it has been turned one hundred eighty degrees.

Simultaneously with the turning of the spindle 631 by the gear 634, an equal but opposite rotative movement is imparted to the shank 652 of the blade 653 by the engagement of the gear 655 with the pinion 654. The resultant turning of the blade 653 relative to the members 636 and 637 causes the blade to enter the fruit in an arcuate path about the core of the fruit. By a rotation of one hundred eighty degrees, the spindle 631 and the shank 652 will arrive at exactly the same space relation as they have before such rotative movement, and the blade 653 will again be retracted between the members 636 and 637.

After the core has been severed from the fruit by turning the blade 653 one hundred eighty degrees, the movement of the cam follower 690 is reversed and it is given an upward motion to reverse the rotation of the gear wheel 624. The threaded collar 623 is screwed upon the inclined split sleeve 618 sufficiently to draw the inner surface of said sleeve 618 into frictional engagement with the clutch member 628. The bearing block 627 thus is disposed to rotate with the shaft 610 in a non-positive manner.

When the shoulders 677 or 678 abut the face 672 or the bolt head 675, slippage occurs between the clutch member 628 and the sleeve 618. The frictional engagement between the sleeve and the clutch member, however, is such that the bearing block 627 will be moved with the shaft. Its movement is not positively arrested in the manner described.

Counterclockwise movement of the shaft 610 conveys the core-extracting parts in a like direction to dump the peeled and cored fruit outwardly of the machine. The extended ends of the core extractors pass beneath the cross bar 660 whereupon the closed side 644 of U-shaped members 643 strike the sprags 666 to rotate the members 643 about the pins 647, so that the extensions 646 lift the fruit from the faces of members 636 and 637 against the resistance of any adhesion of the fruit by vacuum or otherwise. The members 636 and 637 reach a vertical position coincidentally with the loosening of the fruit therefrom, and the shoulder 677 on bearing 627 coincidentally abuts the bolt head 675 in a manner to arrest further rotation of the members 636 and 637 so that the fruit is thrown clear of the machine. The cores drop from the knives 653 into the fruit cups which contain the peel from the fruit. The separation of the cores from the fruit so that the cores remain in the fruit receiving means is accomplished due to the fact that members 636 and 637 are separated and provide a recess or opening and due to the further fact that these members 636 and 637 are flat so that when these members are inverted during the inversion of the pear and when the coring means has completed the severing portion of its operation, the means serves to dump the core through the opening between the members 636 and 637 into the cup while the pear continues its inversion movement and is finally brought uppermost whereby upon subsequent lifting movement (as shown in Figure 16) the pear thus cored and removed from its core may be ejected or discharged from the machine. It will thus be seen that I have provided an improved method for coring half fruit, particularly half pears, wherein the half fruit, particularly a pear, is rotated about one of its axes, and in the case of pears about the stem axis of the pear, while at the same time the coring means, preferably the arcuate coring means, is turned about substantially the same axis and concentrically about the stem axis of the pear, the turning movements being in opposite directions whereby the half pear is cored during the first ninety degree turning movement of the pear and coring devices and wherein thereafter the core may drop through an opening in the means for turning the pear about its stem axis whereby to deposit the core in the pear holding means or cup so that the cored pear, freed of its core, may be removed from the pear holding means.

After movement of the bearing block 627 has been stopped by engaging bolt 675, the shaft 610 continues to rotate within the block. The block being held in a fixed position maintains the bearing of the shank 652 and the spindle 631 stationary so that the continued movement of the bevel gear 624 rotates the shank 652 and spindle 631 one hundred eighty degrees before the direction of the shaft 610 is reversed. The members 636 and 637 are thus restored to the position they occupy when they contact fruit, and are ready to engage other fruit which has been moved to station X by a ninety degree rotation of the main turret. Upon the inward movement of the members 636 and 637 the side 644 of the U-shaped member 643 deflects the sprag 666 out of its path.

*The peel removing apparatus*

Apparatus engages the cups at station Y to remove peel therefrom. The peel removing apparatus is carried upon the shaft 684 in a manner similar to the core-extracting apparatus upon the shaft 610. Between two similarly performing members is a collar 700 secured to shaft 684 by a set screw 701. At either end of the collar 700 are ligatures 702 to support split sleeves 703. The sleeves 703 carry threaded collars 704 which move upon inclined threaded outer surfaces in the sleeves.

The sleeves 703 are positioned upon shaft 684 next to bevel gears 705 which are held upon the shaft by set screws 706 within an offset flange 707. Between each bevel gear 705 and the split sleeves 703 is a compound bearing member 708 which is rotatively mounted upon shaft 684 by means of a bearing 709. Within a horizontal plane above the bearing 709 is a second bearing 710. Extending from the edge of the bearing block 708 adjacent the sleeve 703 is an internal clutch member 711 which projects into the space intermediate the split sleeve 703 and the shaft 684.

The bearing 710 mounts for rotation therein a shaft 712 having at its outermost end a pinion 713. A gear 714 upon the bevel gear 705 operatively engages the pinion 713 to turn the shaft 712. A shoulder 715 contiguous to the inward end of the bearing 710 coacts with the pinion 713 to prevent axial movement of the shaft 712 (Figure 14). Inwardly of the shoulder 715 is a head 716 having a lug 717. Attached to the lug 717 in any suitable manner, as by rivets 718, is a flap or blade 719 which has a flat body having faces 720 of the shape of the face of a half pear. The edges 721 of the flat piece 719 are shaped similarly to the concavity of the fruit cups.

As the rack 689 is drawn downwardly, the shaft 684 turns in an anticlockwise direction (Figure 14). Such anticlockwise movement of the shaft 684 rotates the sleeves 703 in a like manner and also the bearing blocks 708 which are frictionally engaged to the sleeves 703 by the internal clutch member 711. As the flaps 719 are brought over the fruit cups 345 by such counterclockwise movement, they present their faces 720 flatly to the cups 345. Simultaneously with the advancement of the flaps 719 to the cups 345, the shoulder 722 beneath the protruding end of the bearing 710 contacts the end 723 of a bracket 724 secured to the cross piece 688 extending from upright 12 to upright 13. Movement of the bearing block 708 being arrested, the shaft 684 and the beveled gear 705 continue in their anticlockwise movement to rotate the shaft 712 by means of the pinion 713.

The rotative movement imparted to the flap or blade 719 causes its edge 721 to frictionally engage the interior of the fruit cup 345 to scrape the peel therefrom and to deposit such peel upon the now upper face 720 of the flap after said flap has turned one hundred eighty degrees.

The succeeding downward movement of the rack 689 is sufficient to turn the shaft 712 one hundred eighty degrees after the bearing block 708 has contacted the bracket 724. The reversed movement of the rack 689 lifts the paddles 719 from the cups 345 because of the frictional engagement of the clutch 711 with the split sleeve 703, and carries said paddles to a vertical position where their movement is suddenly arrested by the engagement of a lug 725 with the head 726 of a bolt 727 upon the bracket 724 (see Figure 14). The sudden stoppage of the paddle 719 throws the peel therefrom and clear of the machine. The peel left within the fruit cups is in a single solid piece, hence it is not necessary to have the edges 721 of the wings serrated to conform with the grooves 345a in the cups. The grooves 345a are parallel to the motion of the flap edge so that the groove edges 345b will not interfere with the blade slippage incident to the scavenging of the cups.

The bearing block 708 is held in a vertical position by the lug 725 and the bolt head 726 until the bevel gear 705 has been rotated sufficiently to bring the opposite end of the gear 714 into engagement with the pinion 713, and to have turned the pinion through one hundred eighty degrees. Having thus turned the pinion through an angle of one hundred eighty degrees, the paddle is again in position to be carried forwardly and downwardly to engage the succeeding pair of peel bearing fruit cups. Any core remaining in the fruit cups is swept out by blades 719.

The fruit cups upon being scavenged of peel at station Y are advanced to station Z where the halves of another fruit are deposited therein by the splitting mechanism.

The term "pad" as used in the specification and claims includes any type of construction for engaging the flat, cut face of a half fruit to accomplish the functions demanded of the auxiliary fruit holding means 636 and 637.

What is claimed as new and is desired to be secured by Letters Patent of the United States is:

1. A fruit treating apparatus comprising means for holding a half fruit, coring means for said half fruit including a member movable through said holding means to remove the cored fruit therefrom, and means upon said movable member to force the fruit therefrom.

2. A fruit discharging device comprising means for holding a half fruit, fruit contacting means having a plane face complemental to the plane face of the half fruit, means for moving said fruit contacting means through said holding means, and fruit ejecting means upon said first means and movable relatively thereto, said second means having a plane face normally in alignment with the plane face of said body and being movable out of alignment with the plane face of said body for freeing fruit from said first means.

3. A fruit discharging device comprising means for holding a half fruit, a pad having a plane face complemental to the plane face of the half fruit, means for turning the pad relatively to the holding means, and a tiltable end member upon said pad having a plane face normally in alignment with the plane face of said pad, and means for moving said end member for elevating the end of a fruit engaged thereby from contact with said pad.

4. In a fruit treating device, a sectional pad having a flat face for engaging the flat face of a half fruit, a holding means for the fruit when so engaged by the pad, means for moving the pad to remove the fruit from the holding means, one section of the pad being angularly movable to the other section to free the pad of adhering fruit.

5. In a fruit discharging device, a pad comprising members having aligned faces for engaging the flat face of a half fruit, a holding means for the fruit when so engaged by the pad, means for moving the pad to remove the fruit from the holding means, and means for moving one member angularly to the other member to free the pad of adhering fruit.

6. A fruit discharging device comprising in combination, means for holding a half fruit, a pad for assisting in holding the half fruit and comprising a body having an extension, and a wing pivoted in said extension, said body and wing each having a flat face and said flat faces normally being in alignment, means for moving the pad to remove the fruit from the holding means, movement of said wing about its pivot lifting a half fruit away from said pad.

7. In combination, a receptacle for holding a half fruit, a pad having a flat face for engaging the flat face of the half fruit and of a length less than the normal length of the flat face of the fruit engaged thereby, means for turning the pad about an axis passing substantially through the cut face of the fruit, a movable extension member having a flat face normally in alignment with and contiguous to the flat face of the pad to engage the remaining flat face of such fruit, and means for moving said extension member to disalign said flat faces.

8. In combination, means for holding a half fruit, a pad for engaging the cut face of the fruit and having a flat face, means for turning the pad relatively to the holding means, a flipper pivoted in said pad and having a flat face normally in alignment with the flat face of said pad, and means for moving said flipper.

9. In combination, means for holding a half fruit, a movable pad having a body and an extension, a flipper in said extension, the body and flipper having flat faces normally in alignment for conjointly engaging the flat face of the half fruit, means for moving the pad, and movable means in the path of said pad to impinge said flipper to disalign said pad and flipper faces.

10. The combination described in claim 9, and in which said means in the path of said pad is movable and has a stop preventing movement of said movable means out of the path of said pad when said pad is moved in one direction.

11. In combination, means adapted to embrace the curved walls of a half fruit to hold the same with the cut face exposed, a sectional pad having a flat face which is adapted to contact the flat face of the half fruit, means for pivotally moving the entire pad at an angle to the holding means to remove the fruit therefrom, and means for moving one section of the pad angularly to the remainder thereof during the first mentioned angular movement to discharge the half fruit from the pad.

12. In combination, means for holding a half fruit, a tiltable pad having a flat face for engaging the flat face of the half fruit, said pad having a movable end forming a section of the flat face of said pad, means for tilting said pad, and means in the path of said movable end to displace said end relatively to the face of said pad as said pad is tilted.

13. In combination, means for holding a half fruit, a pad having a flat face for engaging the cut face of the half fruit, said pad having at its end a movable section forming a part of the face of said pad and having a part projecting beyond said pad, means for angularly moving said pad, and means in the path of the projecting part of said movable section to move it relatively to said pad as said pad is moved.

14. The herein described method of cutting a half fruit to remove a portion of the substantially central part of the face thereof comprising holding the fruit so as to permit the same to be turned about an axis lying substantially parallel to the cut face of the half fruit, turning the fruit about such axis, cutting the fruit while so turned, discharging the cut portion from the half fruit while the fruit is so held and thereafter discharging the cut fruit from the holding means separate from its cut portion.

15. The herein described method of coring half fruit comprising contacting the cut face of the half fruit at points thereon substantially removed from the core zone of the fruit, turning the fruit while so contacted and about an axis lying within the plane of the cut face of the fruit, coring the fruit while so contacted, discharging the core from the fruit during the turning of the fruit and thereafter discharging the cored fruit.

16. The herein described method of treating half pears which have their stem axes lying in the plane of their cut faces, comprising holding a half pear in substantially cup-shaped means with its cut face uppermost, peeling the pear while in said means, turning the pear about its stem axis and relatively to the peeling, coring the pear and discharging the coring on top of the peeling, and removing the cored and peeled pear.

17. The herein described method of treating half pears comprising holding a half pear in substantially cup-shaped means with its face uppermost, peeling the pear while in said means, turning the pear about an axis lying substantially in its cut face and relatively to the peeling, coring the pear and discharging the coring on top of the peeling, removing the cored and peeled pear and scavenging the cup-shaped means of the peeling and core.

18. The herein described method of treating half pears comprising supporting a half pear with its face exposed, peeling the pear while so supported, coring the pear and turning the pear while so supported about an axis lying within the plane of the cut face of the half pear and relatively to its severed peeling, to substantially invert the pear and discharge the coring onto the peeling, and remove the pear from the core and peeling.

19. The herein described method of coring a half pear having its stem axis lying substantially within the cut face of the pear, comprising holding the half pear with its cut face substantially uppermost and so as to permit it to be turned about its stem axis, turning the pear in one angular direction sufficiently while moving cutting means concentrically substantially about the stem axis of the fruit and sufficiently in an opposite direction whereby to core the half pear in less than one hundred eighty degrees angular movement of the half pear whereby upon the substantial inversion of the half pear the severed core will drop free from the pear.

20. In combination, substantially cup-shaped means for holding a half fruit about its curved periphery leaving the cut face of the fruit exposed, means for peeling and coring the fruit while so held, means shiftable relatively to the holding means for discharging the peeled and cored fruit from the holding means, while leaving the peeling and core in said holding means.

21. In combination, means for receiving a half fruit with its flat face exposed, means for severing the seed-containing section, means for turning the fruit relatively to its receiving means and for turning the fruit and severing means relatively to sever the seed-containing section of the fruit for removing the half fruit from the receiving means, and for discharging the seed-containing section into the receiving means.

22. In combination, substantially cup-shaped holding means for receiving and holding a half pear with its cut face exposed, means for turning the pear in the holding means about the steam axis of the pear, means for coring the pear while held in the holding means, means for discharging the core into the holding means, and means for discharging the cored pear from the holding means.

23. In combination, means for holding a half pear, said pear having its stem axis lying substantially within the plane of its cut face, means for turning the pear about its stem axis while so held, means for coring the pear while so turned, means for discharging the core while the pear is so held, and means for discharging the cored pear from the holding means.

24. In combination, a substantially cup-shaped holding means for receiving a half fruit therein with its plane face exposed, means for turning the half fruit about the stem axis in the holding means in one angular direction, a substantially arcuate cutter disposed to move substantially about the stem axis of the half fruit, means for moving said cutter in an opposite direction during the movement of the half fruit whereby to sever the seed-containing section of the half fruit before the half fruit becomes inverted whereby during the completion of the inversion of the half fruit the severed seed section will drop from the half fruit into the holding means.

25. In combination, an automatic machine for treating half fruit comprising a movable turret provided with a plurality of spaced, substantially cup-shaped fruit holding members adapted to hold half fruit with their faces uppermost, means for peeling a half fruit at one station leaving the peeling and the peeled half fruit in the holding member, means at another station for turning the half fruit substantially one hundred eighty degrees about its stem axis and for severing the seed-containing section, means for discharging the seed section into the cup on top of the peeling and for discharging the cut and peeled half fruit at said second station, and means operable at another station for scavenging the cup of the peeling and the seed-containing section.

26. In combination, means for holding a half pear with its cut face exposed, means for turning the pear about its stem axis and relatively to its holding means, means for coring the pear while so held, means for bodily moving the cored pear in a plane passing through the stem axis of the pear, and means for forcibly ejecting the pear from the removing means.

27. In combination, a substantially cup-shaped receiving means for holding a half pear with its face exposed, means for turning the half pear in said receiving means and about the stem axis of the pear, an arcuate cutting means disposed concentrically of the stem axis of the pear, means for turning the cutting means in a direction counter to the directional movement of the pear, whereby to sever the core of the half pear during a substantially ninety degree turning movement of the pear, and means for discharging the core from the coring means and into the cup-like receiver and free of the pear during the completion of the turning movement of the pear, and means for thereafter removing the pear from the receiving means.

28. The combination of means for supporting the curved periphery of a half fruit with the plane face of the fruit exposed, additional spaced apart supporting means engaging portions of the plane face of the fruit at points spaced from a central zone, means for turning the supported half fruit about an axis passing substantially through the face of the fruit, cutting means adapted to cut a central zone from the fruit and movable relatively to the fruit in a path substantially concentric with the first mentioned axis and means for discharging the cut portion through the space between the said additional supporting means during the turning movement of the fruit and means for thereafter discharging the cut fruit from the supporting means.

29. The combination of a substantially cup-shaped fruit holding means for supporting a half fruit with the plane face exposed, additional spaced apart supporting means engaging the exposed face of the fruit at points spaced apart from the core or pit zone of the fruit, cutting means for the core or pit of the fruit means for turning the supported half fruit about an axis passing through the core zone and for causing the cutting means to core or pit the fruit, and means for causing the discharge of the core from the fruit through the space between the spaced additional supporting means and means for discharging the cored fruit from its supporting means.

30. The combination of means for holding a half fruit, means for turning the half fruit about an axis lying substantially parallel to the cut face of the half fruit while so held in the holding means, means for cutting the core or pit while the fruit is so held, means for discharging the core or pit from the half fruit while the fruit is so held, and means including the turning means for discharging the cored or pitted fruit from the holding means.

31. A fruit-treating apparatus comprising means for holding a half fruit, arcuately movable cutting means for cutting free therefrom the central seed-carrying portion of the half fruit, means movable through said holding means to remove the fruit from said holding means, and movable means upon the movable member to force the fruit from said movable member.

32. A fruit-treating apparatus comprising means for holding a half fruit with its cut face exposed, means for cutting into the cut face of the half fruit for cutting free the central seed-carrying section of the half fruit, means turnable through said holding means to remove the cut fruit from said holding means, and means shiftable relatively to the turnable means to force the fruit from said turnable means.

33. The herein-described method of treating half fruit, comprising embracing the curved walls of a half fruit to hold the half fruit with the cut face of the half fruit exposed, peeling the half fruit while so held, cutting free the seed-carrying portions of the half fruit while so held and turning the half fruit about an axis extending parallel to the cut face of the half fruit substantially to invert the half fruit to discharge the seed-carrying portion.

34. The herein-described apparatus for treating half fruit, comprising means for holding a half fruit with its cut face exposed, means for peeling the half fruit while so held, means for cutting free the seed-carrying portion of the half fruit, and means for turning the half fruit about an axis lying parallel to the cut face of the half fruit to such a position to discharge the seed-carrying portion into the holding means.

35. In a fruit-treating apparatus, the combination of means comprising a substantially cup-shaped means for contacting the curved surfaces of a half fruit, means adapted to contactingly overlie the cut face of the half fruit including means for severing the seed-carrying portion of the half fruit while held between said contacting means, means for removing the half fruit from the cup-shaped means, and means for discharging the severed seed-containing portion into the cup-shaped means.

36. In a fruit treating apparatus, the combination of means comprising a substantially cup-shaped means for contacting the curved surfaces of a half fruit, means adapted to contactingly overlie the cut face of the half fruit including means for severing the seed-carrying portion of the half fruit while held between said contacting means, and means for turning the second-named fruit-contacting means on an axis substantially parallel to the cut face of the fruit to discharge the half fruit from the cup-shaped means and the seed-containing portion into the cup-shaped means.

37. The herein-described method of treating half fruit comprising holding a half fruit with its cut face uppermost and exposed, and with the peeling severed from the half fruit while so held and leaving the peeling in the same normal relation it occupied before being cut from the half fruit, and with the seed-carrying portion thereof severed therefrom, and turning the half fruit about an axis lying parallel to the plane cut face of the half fruit and relatively to its peeling, leaving the peeling in its original position whereby substantially to invert the half fruit relatively to its peeling and to discharge the severed seed-carrying portion into the peeling.

38. The herein-described method of treating half fruit comprising holding a half fruit with its cut face uppermost and exposed, peeling the half fruit while so held and leaving the peeling in the same normal relation it occupied before being cut from the half fruit, cutting free from the half fruit the seed-carrying portion thereof and turning the half fruit about an axis lying parallel to the plane cut face of the half fruit and relatively to its peeling, leaving the peeling in its original position, whereby substantially to invert the half fruit relatively to its peeling, discharging the cut half fruit from its peeling, and dumping the severed seed-carrying portion into the peeling.

39. An apparatus for treating half fruit comprising means forming a substantially dished holding means for holding half fruit with its substantially plane cut face exposed, means for peeling the half fruit, means for severing the seed-carrying portion of the half fruit, means for bodily shifting the cut half fruit out of its holding means while retaining the holding means in substantially stationary position, including means for discharging the seed-carrying portion into the holding means.

40. The herein-described apparatus for treating half fruit which comprises means forming a relatively dished holding means for holding a half fruit with its cut face exposed, means for removing the seed-carrying section of the half fruit, and means for discharging the half fruit from the holding means and for discharging the severed seed-carrying portion into the holding means.

41. In a device of the class described, the combination of a substantially cup-shaped holding means for holding a half fruit with its cut face exposed, means for severing the seed-carrying portion of the half fruit and for turning the half fruit about an axis lying parallel to the cut face of the half fruit, including means for discharging the severed seed-carrying portion into the holding means and for discharging the severed fruit away from the holding means.

42. In a device of the class described, the combination of holding means for holding a half fruit with its cut face exposed, means for severing the seed-carrying portion of the half fruit, means for turning the half fruit about an axis extending parallel to the cut face of the half fruit whereby substantially to invert the half fruit with respect to its holding means, said means being constructed and arranged to cause the severed seed-carrying portion to discharge into the holding means, means for pivotally moving said discharging means away from the holding means, and means for forcing the severed half fruit from the discharging means.

43. In a fruit treating machine, the combination of main fruit holding means for holding a half fruit with its cut face exposed, auxiliary fruit holding means having spaced apart portions adapted to contact the cut flesh of the half fruit on opposite sides of the seed-containing section at the cut face of the half fruit and having an opening disposed in registration with the seed-containing section of the half fruit, severing means turnable in said opening during the severing operation about a single axis lying substantially in the plane of the cut face of the half fruit to cut a section from the fruit closely approximating the shape of the seed-containing section thereof, and power actuated means for shifting the auxiliary fruit holding means relatively toward and from the main fruit holding means, said power actuated means including mechanism for actuating the severing means in one direction relative to the auxiliary fruit holding means when said auxiliary fruit holding means contacts the fruit whereby to sever the fruit and said mechanism including means holding said severing means against movement in the opposite direction relative to the auxiliary fruit holding means until said auxiliary fruit holding means is shifted away from the main fruit holding means.

44. In a fruit treating machine, the combination of a turret mounted to rotate in a substantially horizontal plane and provided with a plurality of spaced fruit holding cups into which halves of fruit are adapted to be positioned with their cut faces uppermost, auxiliary fruit holding means having an opening therein adapted to be positioned over the central seed-containing section of the half fruit, means for severing the seed-containing section of the half fruit, said severing means comprising a knife turnable in said opening about a single axis lying substantially in the plane of the cut face of the half fruit to cut a section from the fruit closely approximating the shape of the seed-containing section thereof, and power actuated means including intermittently operable means for intermittently rotating the turret and fruit holding cups, said power actuated means including means for positively forcing the auxiliary fruit holding means and severing means toward the fruit and for forcing said severing means into contact with the cut uppermost surface of the half fruit between movements of the turret, and means operable thereafter but still between movements of the turret to actuate said knife to remove the seed-containing section from the half fruit.

45. In a fruit treating machine, the combination of a turret mounted to rotate in a substantially horizontal plane and provided with a plurality of spaced apart fruit holding cups into which halves of fruit are adapted to be positioned with their cut surfaces uppermost, cutting means to sever the seed-containing portion of the half fruit therefrom, a shiftable support on which said cutting means is journalled for relative rotation about a single axis substantially in the plane of the cut surface of the half fruit, means for intermittently rotating the turret and the fruit holding cups, and means for shifting said shiftable support toward a fruit holding cup to bring the cutting means in juxtaposition to the cut surface of the half fruit and for relatively rotating said cutting means in one direction, said means shifting said support away from the fruit holding cup following the relative rotation of the cutting means, means maintaining said shiftable support against movement during the relative rotation of said cutting means in said one direction about said single axis to cut a section from the fruit closely approximating the shape of the seed-containing section thereof, and means maintaining the cutting means against relative rotation in the opposite direction until the shiftable support is moved away from the fruit holding cup.

46. In a machine for treating half fruit, the combination of means for holding a half fruit with its cut face exposed, auxiliary fruit holding means having portions adapted to contact the cut face of the half fruit on opposite sides of the seed-containing section at the cut face of the half fruit, said auxiliary holding means having an opening registering with the seed-containing section of the half fruit, cutting means operable in said opening and rotatable about a single axis substantially coincident with the longitudinal axis of the half fruit during the cutting operation to cut through the flesh of the half fruit around the seed-containing section to sever the same, means for shifting the auxiliary fruit holding means relatively to and from a position in juxtaposition to the cut face of the half fruit, and mechanism for actuating the cutting means to cause the same to rotate in one direction about said single axis and to cut through the flesh of the half fruit around the seed-containing section to sever the same when the auxiliary fruit holding means is in juxtaposition to the half fruit, said mechanism including means for holding said cutting means against movement in the opposite direction until the auxiliary holding means has been shifted away from its position in juxtaposition to the half fruit.

47. In a fruit treating machine, the combination of a turret mounted to rotate in a substantially horizontal plane and provided with a plurality of spaced apart fruit holding cups into which halves of fruit are adapted to be positioned with their cut faces uppermost, shiftable auxiliary fruit holding means having spaced apart portions adapted to contact the cut surface of the half fruit supported within the cups and having an opening therein adapted to be positioned over the central seed-containing section of the half fruit, severing means shiftable with and relative to said auxiliary fruit holding means for cutting a substantially semiellipsoidal section in that portion of the cut face of the half fruit which contains the seed for severing the seed-containing section of the half fruit, and power actuated means including intermittently operable means for intermittently rotating the turret and fruit holding cups, said power actuated means including driving means for positively forcing the auxiliary fruit holding means and severing means toward the fruit and for forcing said severing means into contact with the cut uppermost surface of the half fruit, means to shiftably actuate said severing means in one direction in said opening and relative to said auxiliary fruit holding means to remove the seed-containing section from the half fruit, said driving means thereafter shifting said auxiliary fruit holding means away from the fruit holding cup, and means holding said severing means against actuation in the opposite direction until said auxiliary fruit holding means is shifted away from the cup.

48. In combination, means for holding a half fruit with its cut face exposed, said holding means conforming generally to the uncut curved wall of the fruit, means for turning the fruit about an axis extending parallel to the cut face of the fruit to substantially invert the fruit relatively to its holding means, means for severing the seed-containing section of the fruit, means for discharging the severed seed section of the fruit into the holding means, and means including said turning means for removing the half fruit from the holding means leaving the seed section within the holding means.

49. The combination with a support rotatable about an axis, and a coring blade thereon rotatable about an axis normal to the first mentioned axis, of means for displacing said support and blade about the first axis and thereafter precluding movement of the blade about such first axis while moving said support and blade about their respective axes.

50. A coring device comprising a support rotatable about an axis, a pad, coring means, said pad and coring means being upon said support for movement therewith about such axis through a predetermined arc and being arranged for concentric movement about a second axis, means precluding movement of said pad and coring means beyond a limit of such arc, and means causing rotation of said pad and coring means about such second axis while at the limit of such arc.

51. The combination with a cup adapted to hold a half fruit with its cut face exposed, of a concentrically arranged pad and coring means rotatable about an axis coinciding substantially with the axis of the half fruit in said cup, means for moving said pad and coring means into close proximity to such half fruit, and other means for imparting rotary movement to said coring means and pad, the movements of said pad and coring means being timed so that the coring means maintains the fruit upon the pad as the latter is being rotated to discharge the fruit from the cup and releases the fruit as the rotating movement of the pad is completed.

52. In combination, a cup for a half fruit, fruit holding means closing said cup, means for coring the fruit in said cup, said holding means and said coring means extended transversely of the mouth of said cup and in a plane parallel thereto, and means for rotating said holding means and said coring means about axes in said parallel plane.

53. In combination, a cup for a half fruit, a tiltable fruit holding member for engaging a fruit in said cup and rotatable about an axis extending across the mouth of said cup, a knife for coring fruit in said cup and extending across the mouth of said cup and rotatable about an axis substantially coincident with the axis of said holding member, and means for rotating said fruit holding member and said knife about such axes and thereafter tilting said fruit holding member away from said cup.

54. In combination, a shaft, a coring blade mounted upon said shaft and having an axis of rotation normal to the axis of rotation of said shaft, said blade being operably connected to said shaft for actuation thereby, and means for rotating said shaft to first move said blade in an arc about said shaft and to thereafter rotate said blade about its axis.

55. For coring a half fruit, a device comprising a fruit holding cup having a surface conforming to and engaging the curved periphery of such half fruit, rotatable coring means having a cutting edge at one side thereof to core such fruit and extending diametrically of and entirely across the cut face thereof, tiltable and rotatable fruit engaging means for holding such fruit in said cup and having portions engaging the flat face of such fruit at either side of said coring means, means for rotating said coring means and said fruit engaging means, and means for tilting said fruit engaging means anterior to and subsequent to such rotation.

56. In a coring device, a coring blade, means for operating said blade, a pad adapted to rest upon the flat face of a half fruit while said coring blade is operating, means for moving said pad angularly, and a stop engaging said pad to dislodge fruit therefrom.

57. In combination, a receptacle for a half fruit exposing the cut face thereof, rotatable means registrable with said receptacle and having a portion for engaging the exposed face of such half fruit, core severing means disposed longitudinally of said rotatable means and rotatable on the axis of the rotatable means, and means for rotating said rotatable means and said severing means on such common axis.

58. In combination, a coring device comprising a rotatable pad having a face adapted to engage the flat face of a half fruit, said pad being rotatable on an axis in the plane of its fruit engaging face, a coring blade mounted within said pad for rotation therefrom to remove the core portion of engaged fruit, said blade being concentric of said pad and having an axis parallel with the plane of the pad, and means for causing concentric rotation of said blade and pad through predetermined arcs.

59. A coring device comprising a pad having an opening and engaging the flat face of a half fruit, a coring blade journalled diametrically of such opening for rotatation about an axis coincident with the axis of said pad and normally retracted substantially wholly into such opening, said coring blade being rotatable through a path out of such opening about the core portion of such half fruit, means for imparting rotary movement to said blade, and means for rotating said pad relatively to said blade.

60. A coring device comprising, in combination, a shaft, mounting means frictionally disposed upon said shaft, seed severing means on said mounting means and rotatable on an axis normal to said shaft, driving means between said shaft and severing means, and means for rotating said shaft, rotation of said shaft normally shifting said mounting means and said severing means angularly about said shaft, said shaft rotating said severing means in said mounting means when movement of said mounting means with said shaft is arrested.

61. A device for coring a half fruit, comprising a cup engaging the curved periphery of such half fruit, an elongated cutting member dished transversely of its length and having a sharpened longitudinal edge extending across the flat surface of the half fruit in the cup to core such fruit, the central section of said dished member subtending longer radii than sections to either side thereof, and a fruit holding pad having a diametric opening therein to receive said cutting member, said pad having a face adapted to engage the flat surface of such fruit during the coring operation, said cutting member being rotatable on an axis in the plane of said fruit holding pad.

62. A device for removing the seed-containing section of a half fruit, comprising turnable fruit holding means engaging the cut face of the half fruit, cutting means turnable in the plane of and about the axis of said holding means, and means for turning said holding means and said cutting means relatively about such common axis.

63. In combination, rotatable fruit holding means having spaced fruit engaging faces, coring means rotatable in the space between said faces on the axis of and in the plane of said fruit engaging faces, and means for rotating said holding means and said coring means on their common axis.

64. In combination, means for sustaining a half fruit, means for bodily moving the fruit relatively to its sustaining means, and movable cutting means for severing a portion from the fruit while the latter is moving.

65. In combination, means for supporting a half fruit, means for bodily moving the fruit relatively to its supporting means while so supported, movable cutting means for cutting a section from the central portion of the fruit while moving, and means for bodily moving the cut fruit from the supporting means.

66. The combination of means for turnably supporting a half fruit about an axis passing substantially through the cut face of the fruit, core cutting means, means for turning the cutting means, and means for turning the half fruit on is said axis in a predetermined direction while turning the cutting means in the counter direction about substantially the same axis to core the fruit.

67. The combination of means for turnably supporting a half fruit, arcuate cutting means, means for turning the half fruit in said supporting means about the stem axis of the fruit, and means for turning the arcuate cutting means about the same axis to cut the core of the fruit, said turning means postioning the fruit for ejection from the supporting means.

68. In combination, means for holding a half fruit with its cut face exposed, means for turning the fruit on an axis lying substantially parallel to the cut face of the half fruit and passing substantially through the center of the core of the fruit, an arcuate cutter, and means for turning the cutter about the same axis while in contact with the core of the fruit to sever the core.

69. In combination, means for holding a half fruit with its cut face exposed, an arcuate cutter, and means for moving the cutter and fruit about an axis passing substantially through the core of the fruit and lying substantially parallel to the cut face of the half fruit to cut the fruit about the core to sever the core.

70. In combination, means for receiving and holding a half fruit with its flat plane face outermost, coring means, and means for moving the fruit relatively to its holding means and for moving the coring means relatively to the fruit to core the fruit during the relative movement between the fruit and its holding means and for removing the cored fruit from the receiving means.

71. In combination, means for holding a half fruit with the peeling severed therefrom but encompassing the half fruit, means for coring the half fruit, and means for turning the half fruit substantially to invert it and for discharging the half fruit from the receiving means leaving the peeling in the receiving means.

72. In combination, means providing a substantially recessed holding means for receiving a half fruit therein, means for turning the half fruit about its axis in one angular direction, cutting means, and means to move the cutting means substantially about the axis around which the fruit turns but in an opposite direction from the direction in which the fruit is turned.

73. In a fruit treating apparatus the combination of means providing holding means adapted to receive and hold a half fruit with its cut face exposed, fruit contacting means providing spaced apart members adapted to overlie and contact the exposed cut face of the fruit on opposite sides of the seed section of the fruit to be severed, means for actuating the contacting means to maintain it in contacting position with the cut face of the fruit, turnable cutting means adapted to sever the seed section from the central portion of the fruit between the two portions of the contacting means while said contacting means are in contact with the cut face of the half fruit, means for actuating such cutting means, and means for shifting the spaced apart members to discharge the fruit from the holding means.

74. In a fruit treating apparatus the combination of a recessed fruit holder adapted to receive and hold a half fruit with its cut face uppermost, fruit contacting means comprising spaced apart portions adapted flatly to contact the cut face of the fruit on opposite sides of a substantially central zone, means for maintaining the contacting means in contact with the face of the fruit, cutting means having a curved cross-section adapted to cut through the cut face of the fruit in that portion of the fruit lying between the spaced apart contacting means means for actuating the cutting means to cause the cutting means to form a continuous, curved line of severance through the substantially central zone of the half fruit, and means for bodily turning the contacting means for discharging the half fruit from the holder.

75. In a fruit treating apparatus, the combination of means forming a recessed holder for receiving and holding a half fruit with its cut face uppermost, means to contact the cut face of the fruit while held in the recessed holder, means for cutting a section of the central portion of the fruit while held in a recessed holder, means for bodily turning the contacting means to invert the fruit in its holding means, and means for thereafter bodily moving the contacting means arcuately to eject the cut half fruit from the holder and the contacting means.

76. In a fruit treating apparatus, the combination of means forming a recessed fruit holder adapted to receive and hold a half fruit with its cut face uppermost, a combined fruit contacting member and cutting device adapted to be positioned to overlie the cut face of the fruit, and means for actuating said contacting device and cutting means to cause the cutting means to cut a section from the cut face of the fruit and to thereafter cause the contacting device and cutting means to move together bodily to eject the cut fruit from the fruit holder.

77. In a fruit treating apparatus, the combination of means forming a recessed fruit holder for receiving and holding a half fruit, and fruit contacting and coring means adapted to overlie the cut face of the half fruit and means for actuating said contacting and coring means to cause them to turn substantially about the same axis to core the fruit.

78. The combination of a recessed holder for the reception of a half fruit with its peel removed and underlying the half fruit, means for coring the half fruit while in the holding means, and means for turning the half fruit arcuately while in the holding means to discharge it from the holding means without discharging the peel.

79. In a fruit treating apparatus the combination of means for sustaining a half fruit with its cut face exposed, means for bodily moving the sustaining means with the half fruit therein along a predetermined path of travel to a fruit cutting station, means for shifting the half fruit relatively to its sustaining means while at the cutting station, and means for severing a central portion of the half fruit during said shifting movement of the half fruit.

80. In a machine for treating a half fruit, a coring device comprising a fruit holding pad having a face for engaging the flat face of such fruit and rotatable about an axis lying substantially within and parallel to such face, cutting means journalled on said pad and rotatable about an axis coincident with the axis of said pad, said cutting means being normally retracted into said pad and movable therefrom about such axis, and means for causing intermittent relative rotation of said pad and cutting means about such axis.

81. In a pear coring machine, the combination of a turret mounted to rotate in a substantially horizontal plane and provided with a plurality of spaced fruit holding means into which halves of pears to be cored are adapted to be positioned with their cut surfaces uppermost, auxiliary fruit holding means having surfaces adapted to contact the cut surface of a pear supported within the holding means, said contacting surfaces being spaced apart a distance approximately corresponding with the area of the central seed-containing section of the half pear and extending on opposite sides of the seed area, coring means having a continuous cutting edge coextensive with the calyx, the core proper and the stem threads of the half pear, intermittently operable means for intermittently rotating the turret and the fruit holding means, said coring means being mounted to turn in the space between the fruit contacting surfaces of the auxiliary holding means, means for shifting the auxiliary holding means and cutting means into contact with the cut, uppermost surface of the pear, with the continuous cutting edge extending parallel to the stem axis of the pear, and means to shift said cutting means while positioned between the spaced contacting portions of the auxiliary holding means to sever the central seed-containing section from the half pear.

82. In a fruit machine, the combination of a turret mounted to rotate in a substantially horizontal plane, spaced fruit holding means carried by the turret, each having means to receive and to hold a half fruit with its cut face uppermost, auxiliary fruit holding means having an opening and having associated fruit contacting portions adapted to contact the cut surfaces of the half fruit while so held with the opening thereof in registry with and over the central seed-containing section of the half fruit, cutting means for severing the seed-containing section, power operated means for intermittently operating the turret for shifting the auxiliary fruit holding means into contact with the cut face of the half fruit, and means for shifting the cutting means into contact with the cut, uppermost surface of the fruit for turning the cutting means in said opening about an axis constantly maintained during the cutting operation parallel and relatively close to the cut face of the half fruit to sever the seed-containing section from the half fruit.

83. In a fruit machine, the combination of a turret, spaced fruit holding means thereon, each having means to receive and to hold a half fruit with its cut face exposed, auxiliary fruit holding means having spaced fruit contacting portions adapted to contact the cut surfaces of the half fruit while so held with the space between said contacting portions in registry with the central seed-containing section of the half fruit, cutting means for severing the seed-containing section, power operated means for intermittently operating the turret, means for shifting the cutting means and the auxiliary fruit holding means into contact with the cut face of the half fruit, and means to actuate the cutting means in said opening to sever the seed-containing section from the half fruit, and to again shift the auxiliary fruit holding means while in contact with the half fruit to discharge the half fruit from the fruit holding means of the turret.

84. In a fruit treating machine, the combination of a turret having spaced means for holding half fruit, each with its cut face exposed, power actuated means for intermittently rotating said turret to bring each fruit holding means in succession to a seed-severing station, auxiliary fruit holding means disposed at said station and having spaced apart portions adapted when a holding means positions a half fruit at said station to contact the cut flesh of the half fruit on opposite sides of the seed-containing section at the cut face of the half fruit, said power actuated means including mechanism operating in timed relation to the intermittent movement of said turret for automatically shifting the auxiliary fruit holding means into contact with the cut face of the half fruit when a fruit holding means of the turret is positioned at said station, the space between said portions of the auxiliary fruit holding means being disposed in registration with the seed-containing section of the half fruit, seed-severing means, said power actuated means including mechanism for actuating said seed-severing means in said space between the portions of the auxiliary fruit holding means during the severing operation and about a single axis lying substantially in the plane of the cut face of the half fruit to cut a section from the fruit closely approximating the shape of the seed-containing section thereof, said power actuated means automatically shifting the auxiliary fruit holding means away from the first mentioned fruit holding means after the severing operation and thereafter automatically shifting the turret to remove the seeded half fruit from said seed-severing station and to position an additional fruit holding means at said seed-severing station.

85. In a fruit treating machine, the combination of a turret mounted to rotate in a substantially horizontal plane and provided with a plurality of spaced fruit holding cups into which halves of fruit are adapted to be positioned with their cut faces uppermost, auxiliary fruit holding means having an opening therein adapted to be positioned over the central seed-containing section of the half fruit, means for severing the seed-containing section of the half fruit, said severing means comprising a knife having an elongated cutting edge extending parallel to the axis of turning of said knife and turnable in said opening, said knife when severing the seed section having its axis of turning constantly maintained parallel to the cut face of the half fruit to cut a section from the fruit closely approximating the shape of the seed-containing section thereof, intermittently operable means for intermittently rotating the turret and fruit holding cups, means for positively forcing the auxiliary fruit holding means and severing means toward the fruit and for forcing said severing means into contact with the cut, uppermost surface of the half fruit, and means to actuate said knife to remove the seed-containing section from the half fruit.

86. In a fruit treating machine, the combination of a turret mounted to rotate in a substantially horizontal plane and provided with a plurality of spaced apart fruit holding cups into which halves of fruit are adapted to be positioned with their cut surfaces uppermost, cutting means to sever the seed-containing section of each half fruit therefrom, a shiftable support on which said cutting means is journalled for relative rotation during the seed-severing operation about a single axis lying substantially in the plane of the cut surface of the half fruit, means for intermittently rotating the turret and the fruit holding cups, and means for shifting said shiftable support to bring the cutting means in juxtaposition to the cut surface of the half fruit, said means maintaining said shiftable support against movement during the relative rotation of said cutting means about said single axis during the seed-severing operation to cut a section from the fruit closely approximating the shape of the seed-containing section thereof.

87. In a fruit treating machine, the combination of means for holding a half fruit with its cut face exposed, auxiliary fruit holding means having spaced apart portions adapted to contact the cut flesh of the half fruit on opposite sides of the seed-containing section at the cut face of the half fruit and having an opening disposed in registration with the seed-containing section of the half fruit, turnable severing means operating within the opening for severing from that portion of the cut face of the half fruit which contains the seed a substantially semiellipsoidal section, the axis of which is substantially coincident with the longitudinal axis of the half fruit whereby to remove the seed-containing section, means for shifting the auxiliary fruit holding means and severing means relative to the first mentioned fruit holding means to discharge the seeded half fruit from the fruit holding means.

88. In a device for treating half fruit, the combination of a turret mounted to rotate in a predetermined plane and provided with a plurality of spaced fruit holding means into which halves of fruit are adapted to be positioned with their cut faces outermost, auxiliary fruit holding means mounted to move toward and from the turret, cutting means operable between spaced portions of said auxiliary fruit holding means for severing the central seed-containing section of the half fruit, power actuated means for rotating the turret intermittently to position a fruit holding means opposite said cutting means, and means power actuated in timed relation to the movement of said turret for moving the auxiliary fruit holding means and cutting means toward a half fruit in its holding means to position the auxiliary fruit holding means and the cutting means into contact with the cut outermost surface of the half fruit, said power actuated means including mechanism arcuately to move the cutting means about a single axis constantly maintained during cutting substantially parallel to the cut face of the half fruit to sever the seed-containing section from the half fruit.

89. In a machine for treating half fruit, the combination of means for holding a half fruit with its cut face exposed, auxiliary fruit holding means having portions adapted to contact the cut face of the half fruit on opposite sides of the seed-containing section at the cut face of the half fruit, said auxiliary holding means having an opening registering with the seed-containing section of the half fruit, seed-cutting means operable in said opening to cut through the flesh of the half fruit around the seed-containing section to sever the same, means for relatively shifting the main and auxiliary fruit-holding means to and from a position wherein the auxiliary fruit holding means is in juxtaposition to the cut face of the half fruit, and mechanism for actuating the cutting means to cause the same to move in one direction to cut through the flesh of the half fruit around the seed-containing section to sever the same when the auxiliary fruit holding means is in juxtaposition to the half fruit, said mechanism including means for holding said cutting means against movement in the opposite direction until the main and auxiliary holding means have been relatively shifted away from the position wherein the auxiliary fruit holding means is in juxtaposition to the half fruit.

90. In a machine for treating half fruit, the combination of main holding means for holding a half fruit with its cut face outermost, auxiliary fruit holding means having portions adapted to contact the cut face of the half fruit on opposite sides of the seed-containing section at the cut face of the half fruit and having an opening adapted to register with the seed-containing section of the half fruit, seed cutting means operable in said opening to move in one direction to cut through the flesh of the half fruit around the seed-containing section to sever the same, means for relatively shifting the main and auxiliary fruit holding means to and from a position wherein the auxiliary fruit holding means is in juxtaposition to the first mentioned fruit holding means and contacts the cut face of the half fruit, from and to a position in which said main and auxiliary fruit holding means are spaced apart, mechanism for actuating the cutting means to cause the same to move in one direction to cut through the flesh of the half fruit around the seed-containing section to sever the same when the auxiliary fruit holding means is in such juxtaposed position to the first mentioned fruit holder, said shifting means subsequently producing a relative shifting movement between the first mentioned fruit holding means and the auxiliary fruit holding means to cause them to assume the spaced apart position, and means for reversely shifting the severing means while said fruit holding means are in said spaced apart position and prior to the next relative approaching movement of said main and auxiliary fruit holding means to contactingly embrace therebetween another half fruit.

91. In a machine for treating half fruit, the combination of a fruit holder for holding a half fruit with its cut face outermost, shiftable auxiliary fruit holding means adapted to contact the cut face of the half fruit on opposite sides of the seed section and having a space between the contacting means registering with the seed section of the half fruit, means for shifting the auxiliary fruit holding means toward the fruit holder and into contact with the cut face of the half fruit while held in the fruit holder, seed severing means mounted on said auxiliary fruit holding means and operable in said space, power actuated means for shifting the auxiliary fruit holding means and seed severing means toward the first mentioned fruit holder to contact the cut face of the half fruit, and means actuated by said power actuated means in timed relation with the movement of the auxiliary fruit holding means and seed severing means toward the fruit holder and upon contact of the auxiliary fruit holding means with the cut face of the half fruit for operating the seed severing means to sever the seed-containing section of the half fruit, said power actuated means including means for moving the auxiliary fruit holding means away from the first mentioned fruit holder, said means actuated by said power actuated means including means operative for subsequently operating the seed severing means while the auxiliary fruit holding means is positioned away from the first mentioned fruit holding means to so position the seed severing means relatively to said auxiliary fruit holding means that on subsequent actuation of said auxiliary fruit holding means into contact with the cut face of the half fruit said severing means will be operatively positioned at the cut face of the half fruit to immediately begin its seed severing operation through the flesh of the half fruit in the space formed in said auxiliary fruit holding means.

92. A fruit treating apparatus comprising, in combination, means for holding a half fruit with its cut face exposed, means shiftable to and from said holding means, mechanism including means carried by said shiftable means for severing the central seed-carrying portion of the half fruit, mechanism including means carried by the shiftable means for substantially inverting the half fruit and including means for moving the half fruit away from said holding means to a discharge point removed from said holding means.

93. In a fruit treating machine, the combination of an intermittently operable turret provided with a plurality of spaced apart fruit holding means, each adapted to receive and hold a half fruit with its cut face exposed, shiftably mounted fruit contacting means having a surface adapted to contact the cut face of a half fruit in a fruit holding means and having an opening in said surface adapted to register with the seed-containing section of the fruit, seed severing means operable in the opening in said fruit contacting means and movable about a single axis substantially parallel with the cut face of a half fruit to sever the seed-containing section from the half fruit, power actuated mechanism for shifting said fruit contacting means into contact with the cut face of the half fruit with its opening registering with the seed section of a half fruit, said power actuated mechanism including means for causing the fruit contacting means to press upon the cut face of the half fruit in a direction toward the fruit holding means with a uniform pressure maintained substantially constant during the severing operation of the seed severing means, and means for actuating the seed severing means.

94. In a fruit treating device the combination of means embracing the curved surfaces of a half fruit for holding a half fruit with its cut face exposed, means for cutting free thereof the seed-containing portion of the half fruit while the half fruit is so held, and means for turning the half fruit in its holder substantially about an axis passing substantially through the cut face of the half fruit so that the curved face of the fruit is exposed and to discharge the cut portion from the half fruit.

95. In a cutting device for a half fruit the combination of holding means for holding a half fruit with its cut face exposed, cutting means, and means for turning the cutting means about an axis disposed substantially parallel to and adjacent the plane of the cut face of the fruit to remove a central seed-containing portion, and means for turning the cut half fruit about substantially the same axis of turning to invert the half fruit.

96. In a fruit treating device the combination of recessed means for holding a half fruit with its cut face uppermost, turnable means for cutting the central seed-containing portion of the fruit while in the holding means and turnable means for inverting the fruit in the holding means including means for discharging the cut portion into the recessed holding means.

97. In a fruit treating device the combination of recessed means for holding a half fruit with its cut face uppermost, turnable means for cutting the central seed-containing portion of the fruit and for inverting the fruit while in the holding means including means for discharging the cut portion into the holding means and for positioning the cut half fruit in substantially inverted position preliminary to discharge from the holding means.

98. An apparatus for treating fruit comprising recessed means for holding a half fruit with its cut face outermost, cutting means adapted to travel in an arcuate path, the axis of which lies substantially parallel to and substantially at the cut face of the fruit at the central portion of the seed-containing section to be cut, fruit turning means adapted to contact the cut face of the fruit, means for moving the fruit turning means arcuately substantially about the axis of cutting the fruit to substantially invert the fruit and discharge the severed seed-containing section.

99. In a fruit treating device the combination of a recessed fruit holder adapted to receive a half fruit with its cut face outermost, fruit contacting means adapted to contact opposed portions of the cut face of the fruit on opposite sides of the central portion thereof, cutting means mounted for turning in the space between the spaced portions of the fruit contacting means, means for operating the cutting means to cut the central portion of the fruit at the cut face thereof, and means for turning the fruit contacting means to substantially invert the half fruit in the fruit holding means whereby to cause the discharge of the cut portion into the fruit holder.

100. In a fruit treating device the combination of a recessed fruit holder adapted to receive a half fruit with its cut face uppermost, apertured means adapted to contact the cut face of the fruit, cutting means adapted to cut the central portion of the cut face of the fruit within the aperture of said apertured means, and means for bodily turning the half fruit within the recessed holder to substantially invert the same and discharge the severed portion into the holder.

101. In a fruit treating device the combination of a recessed fruit holder for holding a half fruit with its cut face outermost, means having an opening therethrough and having portions adapted to contact the cut face of the fruit, the opening in said means overlying the central portion of the fruit at the cut face thereof, cutting means acting through the opening of said apertured means to cut a section in the central portion of the cut face of the fruit, means for shifting the apertured means to a position substantially to invert the half fruit in the cup preparatory to discharging the cut half fruit from the recessed holding means.

102. A cutting mechanism for half fruit comprising means for supporting a half fruit with its cut face in predetermined position, means for cutting a section in the flesh of the fruit at the substantially central portion of the cut face, said cutting means being mounted to turn on an axis lying substantially parallel to the cut face of the half fruit, means for turning the cutting means, and means for turning the fruit on its own axis to displace the plane of the cut face of the fruit relative to the fruit supporting means.

MARK EWALD.

CERTIFICATE OF CORRECTION.

Reissue No. 21,540. August 27, 1940.

MARK EWALD.

It is hereby certified that error appears in the printed specification of the above numbered patent requiring correction as follows: Page 3, second column, line 37, for the reference numeral "49" read --149--; page 5, first column, lines 65 and 66, for "purpose comprices" read --carriage comprises--; line 69, after "boss" insert --218--; page 7, second column, line 5, for "point" read --points--; page 9, first column, line 34-35, for "channal" read --channel--; page 16, second column, line 26, for the word "extended"read --extending--; page 18, first column, line 12, claim 74, after "means" first occurrence, insert a comma; and that the said Letters Patent should be read with this correction therein that the same may conform to the record of the case in the Patent Office.

Signed and sealed this 15th day of October, A. D. 1940.

Henry Van Arsdale,
Acting Commissioner of Patents.

(Seal)